United States Patent
Liu et al.

(10) Patent No.: US 12,493,905 B2
(45) Date of Patent: *Dec. 9, 2025

(54) METHODS AND SYSTEMS FOR REDUCING ITEM SELECTION ERROR IN AN E-COMMERCE ENVIRONMENT

(71) Applicant: eBay Inc., San Jose, CA (US)

(72) Inventors: Xiao Xiao Liu, Shanghai (CN); Erin Louise Delacroix, Vallejo, CA (US); Elizabeth Dobbin, San Francisco, CA (US); Hema Budaraju, Cupertino, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,052

(22) Filed: Feb. 8, 2024

(65) Prior Publication Data
US 2024/0185321 A1    Jun. 6, 2024

Related U.S. Application Data

(63) Continuation of application No. 17/565,307, filed on Dec. 29, 2021, now Pat. No. 11,935,103, which is a
(Continued)

(51) Int. Cl.
*G06Q 30/00* (2023.01)
*G06Q 30/02* (2023.01)
(Continued)

(52) U.S. Cl.
CPC ......... *G06Q 30/0624* (2025.08); *G06Q 30/02* (2013.01); *G06Q 30/06* (2013.01);
(Continued)

(58) Field of Classification Search
CPC .......... G06Q 30/0627; G06Q 30/0601; G06Q 20/0641; G06Q 30/0631; G06Q 30/02;
(Continued)

(56) References Cited

U.S. PATENT DOCUMENTS

| | | | |
|---|---|---|---|
| 5,852,823 A | 12/1998 | De Bonet | |
| 6,393,427 B1 | 5/2002 | Vu | |

(Continued)

FOREIGN PATENT DOCUMENTS

| | | |
|---|---|---|
| AU | 201129940 | 1/2013 |
| AU | 2012318961 | 4/2014 |

(Continued)

OTHER PUBLICATIONS

"One-Stop Car Shopping," The Advertiser [Adelaide, South Aust], Dec. 10, 2005 (Year: 2005).*
(Continued)

*Primary Examiner* — Anne M Georgalas
(74) *Attorney, Agent, or Firm* — FIG. 1 Patents

(57) ABSTRACT

Methods and systems for displaying, to a user interface, categories of items for the user to select from for querying the system, in order to enable the system to return to the user images of items of the type desired by the user for possible purchase. The items categories of items can be presented to the user interface visually in silhouette form so that the user can select brand and the silhouette image of the type of item desired. Upon selection of the silhouette image, a query is sent to the system and images of the desired type of item are returned to the user interface for presentation to the user, along with certain attributes of the items.

20 Claims, 23 Drawing Sheets

Related U.S. Application Data continuation of application No. 15/655,003, filed on Jul. 20, 2017, now Pat. No. 11,605,116, which is a continuation of application No. 12/749,467, filed on Mar. 29, 2010, now Pat. No. 9,792,638.

(51) Int. Cl.
*G06Q 30/06* (2023.01)
*G06Q 30/0601* (2023.01)

(52) U.S. Cl.
CPC ..... *G06Q 30/0601* (2013.01); *G06Q 30/0623* (2013.01); *G06Q 30/0631* (2013.01); *G06Q 30/06311* (2025.08); *G06Q 30/0641* (2013.01); *G06Q 30/0643* (2013.01)

(58) Field of Classification Search
CPC . G06Q 30/06; G06Q 30/0643; G06Q 30/0623
See application file for complete search history.

(56) References Cited

U.S. PATENT DOCUMENTS

| | | |
|---|---|---|
| 6,446,061 B1 | 9/2002 | Doerre et al. |
| 6,546,309 B1 | 4/2003 | Gazzuolo |
| 6,704,725 B1 | 3/2004 | Lee |
| 6,751,343 B1 | 6/2004 | Ferrell et al. |
| 6,751,600 B1 | 6/2004 | Wolin |
| 6,763,148 B1 | 7/2004 | Sternberg et al. |
| 6,804,683 B1 | 10/2004 | Matsuzaki et al. |
| 6,865,302 B2 | 3/2005 | Chang |
| 6,925,196 B2 | 8/2005 | Kass et al. |
| 6,941,321 B2 | 9/2005 | Schuetze et al. |
| 7,035,440 B2 | 4/2006 | Kaku |
| 7,035,467 B2 | 4/2006 | Nicponski |
| 7,260,568 B2 | 8/2007 | Zhang et al. |
| 7,277,572 B2 | 10/2007 | Macinnes et al. |
| 7,315,833 B2 * | 1/2008 | Schrenk ............ G06Q 30/0251 705/26.62 |
| 7,437,321 B2 | 10/2008 | Hanechak |
| 7,580,867 B2 | 8/2009 | Nykamp |
| 7,603,367 B1 | 10/2009 | Kanter et al. |
| 7,617,016 B2 | 11/2009 | Wannier et al. |
| 7,620,539 B2 | 11/2009 | Gaussier et al. |
| 7,657,126 B2 | 2/2010 | Gokturk et al. |
| 7,783,622 B1 | 8/2010 | Vandermolen et al. |
| 7,882,156 B2 * | 2/2011 | Wykes ............... G06Q 30/0603 707/948 |
| 7,930,546 B2 | 4/2011 | Rhoads et al. |
| 7,996,282 B1 * | 8/2011 | Scott ................. G06Q 30/0603 707/752 |
| 8,073,818 B2 | 12/2011 | Duan et al. |
| 8,081,158 B2 | 12/2011 | Harris |
| 8,121,902 B1 * | 2/2012 | Desjardins ......... G06Q 30/0282 705/26.1 |
| 8,180,690 B2 | 5/2012 | Mayle et al. |
| 8,295,854 B2 | 10/2012 | Osann, Jr. |
| 8,306,872 B2 | 11/2012 | Inoue et al. |
| 8,335,784 B2 * | 12/2012 | Gutt ................. G06F 16/90335 715/825 |
| 8,412,594 B2 | 4/2013 | Kundu |
| 8,429,173 B1 | 4/2013 | Rosenberg et al. |
| 8,467,613 B2 | 6/2013 | Baker et al. |
| 8,520,979 B2 | 8/2013 | Conwell |
| 8,543,580 B2 | 9/2013 | Chen et al. |
| 8,595,651 B2 | 11/2013 | Kenemer et al. |
| 8,719,075 B2 | 5/2014 | MacDonald Korth et al. |
| 8,732,025 B2 * | 5/2014 | Gokturk ............ G06Q 30/0623 705/26.1 |
| 8,732,151 B2 | 5/2014 | Ali et al. |
| 8,738,630 B2 | 5/2014 | Lin |
| 8,781,231 B1 | 7/2014 | Kumar et al. |
| 8,861,844 B2 | 10/2014 | Chittar et al. |
| 8,903,816 B2 | 12/2014 | Dumon et al. |
| 8,949,252 B2 | 2/2015 | Chittar et al. |
| 9,043,828 B1 | 5/2015 | Jing et al. |
| 9,092,458 B1 | 7/2015 | Perona et al. |
| 9,280,563 B2 | 3/2016 | Chittar et al. |
| 9,405,773 B2 | 8/2016 | Chittar et al. |
| 9,471,604 B2 | 10/2016 | Chittar et al. |
| 9,715,510 B2 | 7/2017 | Chittar et al. |
| 9,792,638 B2 | 10/2017 | Liu et al. |
| 9,846,903 B2 | 12/2017 | Kundu |
| 10,528,615 B2 | 1/2020 | Chittar et al. |
| 11,132,391 B2 | 9/2021 | Chittar et al. |
| 11,295,374 B2 | 4/2022 | Kundu |
| 11,605,116 B2 | 3/2023 | Delacroix et al. |
| 11,935,103 B2 | 3/2024 | Liu et al. |
| 2001/0016077 A1 | 8/2001 | Oki |
| 2002/0035518 A1 | 3/2002 | Kano |
| 2002/0087558 A1 | 7/2002 | Bailey et al. |
| 2002/0106111 A1 | 8/2002 | Kass et al. |
| 2002/0143636 A1 | 10/2002 | Carignani |
| 2002/0156694 A1 | 10/2002 | Christensen et al. |
| 2003/0083850 A1 | 5/2003 | Schmidt et al. |
| 2003/0130910 A1 | 7/2003 | Pickover et al. |
| 2003/0187844 A1 | 10/2003 | Li et al. |
| 2004/0030578 A1 | 2/2004 | Cross et al. |
| 2004/0083203 A1 | 4/2004 | Kemp |
| 2004/0182413 A1 | 9/2004 | De |
| 2004/0228526 A9 | 11/2004 | Lin et al. |
| 2005/0022106 A1 | 1/2005 | Kawai et al. |
| 2005/0022708 A1 | 2/2005 | Lee |
| 2005/0071256 A1 | 3/2005 | Singhal |
| 2005/0164273 A1 | 7/2005 | Stoughton et al. |
| 2005/0196016 A1 | 9/2005 | Sato et al. |
| 2006/0080182 A1 | 4/2006 | Thompson et al. |
| 2006/0212362 A1 | 9/2006 | Donsbach et al. |
| 2007/0005571 A1 | 1/2007 | Brewer et al. |
| 2007/0074110 A1 | 3/2007 | Miksovsky et al. |
| 2007/0112640 A1 | 5/2007 | Grove et al. |
| 2007/0162328 A1 | 7/2007 | Reich |
| 2007/0168357 A1 | 7/2007 | Yeong |
| 2007/0172155 A1 | 7/2007 | Guckenberger |
| 2007/0185865 A1 | 8/2007 | Budzik et al. |
| 2007/0257792 A1 | 11/2007 | Gold |
| 2007/0260597 A1 | 11/2007 | Cramer |
| 2008/0040219 A1 | 2/2008 | Kim et al. |
| 2008/0040671 A1 | 2/2008 | Reed et al. |
| 2008/0071553 A1 | 3/2008 | Hamadi et al. |
| 2008/0109327 A1 | 5/2008 | Mayle et al. |
| 2008/0154488 A1 | 6/2008 | Silva et al. |
| 2008/0160956 A1 | 7/2008 | Jackson et al. |
| 2008/0162032 A1 | 7/2008 | Wuersch et al. |
| 2008/0168401 A1 | 7/2008 | Boule et al. |
| 2008/0226119 A1 | 9/2008 | Candelore et al. |
| 2008/0229225 A1 * | 9/2008 | Kaye ................. G06F 16/9537 707/999.005 |
| 2008/0243837 A1 | 10/2008 | Davis et al. |
| 2008/0281814 A1 | 11/2008 | Calistri et al. |
| 2008/0301128 A1 | 12/2008 | Gandert et al. |
| 2009/0018932 A1 | 1/2009 | Evans et al. |
| 2009/0061884 A1 | 3/2009 | Rajan et al. |
| 2009/0094138 A1 | 4/2009 | Sweitzer et al. |
| 2009/0112830 A1 | 4/2009 | Denoue et al. |
| 2009/0132943 A1 | 5/2009 | Minsky et al. |
| 2009/0138376 A1 | 5/2009 | Smyers et al. |
| 2009/0150791 A1 | 6/2009 | Garcia |
| 2009/0172730 A1 | 7/2009 | Schiff et al. |
| 2009/0182612 A1 | 7/2009 | Challener et al. |
| 2009/0193675 A1 | 8/2009 | Sieber |
| 2009/0271293 A1 | 10/2009 | Parkhurst et al. |
| 2009/0276453 A1 | 11/2009 | Trout et al. |
| 2009/0287655 A1 | 11/2009 | Bennett |
| 2009/0313239 A1 | 12/2009 | Wen et al. |
| 2010/0023407 A1 | 1/2010 | Grady et al. |
| 2010/0030578 A1 | 2/2010 | Siddique et al. |
| 2010/0036711 A1 | 2/2010 | Shenfield et al. |
| 2010/0036883 A1 | 2/2010 | Valencia-Campo et al. |
| 2010/0094935 A1 | 4/2010 | Svendsen et al. |
| 2010/0105370 A1 | 4/2010 | Kruzeniski et al. |
| 2010/0135597 A1 | 6/2010 | Gokturk et al. |
| 2010/0138295 A1 | 6/2010 | Caron et al. |
| 2010/0159904 A1 | 6/2010 | Colligan et al. |

(56) References Cited

U.S. PATENT DOCUMENTS

| | | |
|---|---|---|
| 2010/0191770 A1 | 7/2010 | Cho |
| 2010/0203901 A1 | 8/2010 | Dinoff et al. |
| 2010/0217667 A1 | 8/2010 | Mo et al. |
| 2010/0241512 A1 | 9/2010 | Tirpak et al. |
| 2010/0257104 A1 | 10/2010 | Bundy |
| 2010/0262602 A1 | 10/2010 | Dumon et al. |
| 2010/0299132 A1 | 11/2010 | Dolan et al. |
| 2010/0332283 A1 | 12/2010 | Ng et al. |
| 2010/0332324 A1 | 12/2010 | Khosravy et al. |
| 2011/0004522 A1 | 1/2011 | Lee |
| 2011/0040602 A1 | 2/2011 | Kurani |
| 2011/0055238 A1 | 3/2011 | Slaney et al. |
| 2011/0085697 A1 | 4/2011 | Clippard et al. |
| 2011/0093361 A1 | 4/2011 | Morales |
| 2011/0106594 A1 | 5/2011 | Shirey |
| 2011/0106805 A1 | 5/2011 | Bao et al. |
| 2011/0161182 A1 | 6/2011 | Racco |
| 2011/0184831 A1 | 7/2011 | Dalgleish |
| 2011/0191374 A1 | 8/2011 | Bengio et al. |
| 2011/0196724 A1 | 8/2011 | Fenton et al. |
| 2011/0231278 A1* | 9/2011 | Fries ................ G06Q 30/0621 |
| | | 705/26.5 |
| 2011/0235902 A1 | 9/2011 | Chittar et al. |
| 2011/0238534 A1 | 9/2011 | Yakkala |
| 2011/0238536 A1 | 9/2011 | Liu et al. |
| 2011/0238659 A1 | 9/2011 | Chittar et al. |
| 2011/0295711 A1 | 12/2011 | Mazmanyan |
| 2011/0314031 A1 | 12/2011 | Chittar et al. |
| 2012/0054041 A1 | 3/2012 | Williams |
| 2012/0054059 A1 | 3/2012 | Rele |
| 2012/0054060 A1 | 3/2012 | Kundu |
| 2012/0126998 A1 | 5/2012 | Morgan et al. |
| 2012/0159294 A1 | 6/2012 | Gonsalves et al. |
| 2012/0265635 A1 | 10/2012 | Forsblom |
| 2012/0276928 A1 | 11/2012 | Shutter |
| 2012/0302258 A1 | 11/2012 | Pai et al. |
| 2013/0085860 A1 | 4/2013 | Summers et al. |
| 2013/0085900 A1 | 4/2013 | Williams |
| 2013/0226743 A1 | 8/2013 | Kundu |
| 2013/0262455 A1 | 10/2013 | Cramer et al. |
| 2014/0105489 A1 | 4/2014 | Chittar et al. |
| 2014/0156410 A1 | 6/2014 | Wuersch et al. |
| 2014/0324836 A1 | 10/2014 | Chittar et al. |
| 2015/0039393 A1 | 2/2015 | Jain |
| 2016/0012124 A1 | 1/2016 | Ruvini et al. |
| 2017/0004632 A1 | 1/2017 | Chittar et al. |
| 2017/0322951 A1 | 11/2017 | Chittar et al. |
| 2018/0012277 A1 | 1/2018 | Liu et al. |
| 2018/0130121 A1 | 5/2018 | Kundu |
| 2020/0117685 A1 | 4/2020 | Chittar et al. |
| 2022/0383380 A1 | 12/2022 | Liu et al. |

FOREIGN PATENT DOCUMENTS

| | | |
|---|---|---|
| AU | 2011299401 | 5/2014 |
| AU | 2014206199 | 8/2014 |
| CN | 1361494 | 7/2002 |
| CN | 101206749 | 6/2008 |
| CN | 101441651 | 5/2009 |
| CN | 101546406 | 9/2009 |
| CN | 101556584 | 10/2009 |
| CN | 103430202 | 12/2013 |
| CN | 104040577 | 9/2014 |
| CN | 106651521 | 5/2017 |
| EP | 1220129 | 7/2002 |
| KR | 20020069767 | 9/2002 |
| KR | 20100020041 | 2/2010 |
| RU | 2586028 | 6/2016 |
| WO | WO-2001011491 | 2/2001 |
| WO | WO-2009094724 | 8/2009 |
| WO | WO-2011044497 | 4/2011 |
| WO | WO-2012030672 | 3/2012 |
| WO | WO-2012030674 | 3/2012 |
| WO | WO-2013052316 | 4/2013 |
| WO | WO-2014085657 | 6/2014 |
| WO | WO-2012033654 | 1/2015 |
| WO | WO-2016007382 | 1/2016 |

OTHER PUBLICATIONS

"Online Visual Merchandising (VMD) of Apparel Websites," by Young Ha, Wi-Suk Kwon, and Sharron J. Lennon, Journal of Fashion Marketing and Management, vol. 11, No. 4, 2007 (Year: 2007).*

"Sensation Based Clothes Search System," by Damon Shing-Min Liu and Ching-I Cheng, International Conference on Intelligence Information Hiding and Multimedia Signal Processing, IEEE, 2008 (Year: 2008).*

"Definition of silhouette", https://www.dictionary.com/browse/silhouette, 6 pages.

"Japan's Amana Web Site Will Boast Graphi-Based Image Search", Dec. 15, 2006, 2 pages.

"Shop It To Me: About Us", https://www.shopittome.com/about_us, Nov. 13, 2010, 2 pages.

"The Watershed Transformation", Available online at URL: <http://cmm.ensmp.fr/-beucher/wtshed.html>, Mar. 9, 2010, 11 pages.

"TheFind.com Launches Next-Generation Shopping Search Engine that Helps Consumers Find Any Product Sold Online; TheFind.com Strives to Search Every Online Store to Deliver Unbiased, Relevant Shopping Search Results", PR Newswire (New York), Oct. 31, 2006, 2006, 3 pages.

"Wondering how TSO Mobile and GPS Tracking Benefit Passengers and The Public Transportation Industry?", Retrieved from the Internet: URL: http://www.tsomobile.com/TSO-Public-Transportation.html, Jul. 24, 2013, 2 pages.

U.S. Appl. No. 10/979,604, , "Non-Final Office Action received for U.S. Appl. No. 10/979,604, mailed on Dec. 20, 2010", Dec. 20, 2010, 24 pages.

10-2014-7012145, , "Office Action received for Korean Patent Application No. 10-2014-7012145, mailed on Jul. 22, 2015", Jul. 22, 2015, 7 pages.

10-2016-7009512, , "Office Action received for Korean Patent Application No. 10-2016-7009512, mailed on Jun. 1, 2016", Jun. 1, 2016, 9 pages.

11755177.0, , "Extended European Search Report received for European Patent Application No. 11755177.0, mailed on Dec. 23, 2015", Dec. 23, 2015, 5 pages.

11755177.0, , "Office Action received for European Patent Application No. 11755177.0, mailed on Apr. 19, 2017", Apr. 19, 2017, 6 pages.

11755177.0, , "Office Action received for European Patent Application No. 11755177.0, mailed on Feb. 16, 2015", Feb. 16, 2015, 3 pages.

U.S. Appl. No. 12/749,458, , "Advisory Action received for U.S. Appl. No. 12/749,458, mailed on Jul. 14, 2015", Jul. 14, 2015, 3 pages.

U.S. Appl. No. 12/749,458, , "Advisory Action received for U.S. Appl. No. 12/749,458, mailed on May 10, 2013", May 10, 2013, 3 pages.

U.S. Appl. No. 12/749,458, , "Final Office Action received for U.S. Appl. No. 12/749,458, mailed on Apr. 8, 2015", Apr. 8, 2015, 36 pages.

U.S. Appl. No. 12/749,458, , "Final Office Action received for U.S. Appl. No. 12/749,458, mailed on Feb. 13, 2013", Feb. 13, 2013, 26 pages.

U.S. Appl. No. 12/749,458, , "Non-Final Office Action received for U.S. Appl. No. 12/749,458, mailed on Feb. 3, 2012", Feb. 3, 2012, 26 pages.

U.S. Appl. No. 12/749,458, , "Non-Final Office Action received for U.S. Appl. No. 12/749,458, mailed on Jan. 13, 2016", Jan. 13, 2016, 13 pages.

U.S. Appl. No. 12/749,458, , "Non-Final Office Action received for U.S. Appl. No. 12/749,458, mailed on Jul. 20, 2012", Jul. 20, 2012, 24 pages.

(56) References Cited

OTHER PUBLICATIONS

U.S. Appl. No. 12/749,458, , "Non-Final Office Action received for U.S. Appl. No. 12/749,458, mailed on Sep. 30, 2014", Sep. 30, 2014, 40 pages.
U.S. Appl. No. 12/749,467, , "Final Office Action received for U.S. Appl. No. 12/749,467, mailed on Jul. 8, 2015", Jul. 8, 2015, 32 pages.
U.S. Appl. No. 12/749,467, , "Final Office Action received for U.S. Appl. No. 12/749,467, mailed on Jul. 19, 2012", Jul. 19, 2012, 23 pages.
U.S. Appl. No. 12/749,467, , "Final Office Action received for U.S. Appl. No. 12/749,467, mailed on Mar. 8, 2017", Mar. 8, 2017, 14 pages.
U.S. Appl. No. 12/749,467, , "Non-Final Office Action received for U.S. Appl. No. 12/749,467, mailed on Mar. 1, 2012", Mar. 1, 2012, 20 pages.
U.S. Appl. No. 12/749,467, , "Non-Final Office Action received for U.S. Appl. No. 12/749,467, mailed on May 8, 2014", May 8, 2014, 27 pages.
U.S. Appl. No. 12/749,467, , "Non-Final Office Action received for U.S. Appl. No. 12/749,467, mailed on Nov. 7, 2014", Nov. 7, 2014, 24 pages.
U.S. Appl. No. 12/749,467, , "Non-Final Office Action received for U.S. Appl. No. 12/749,467, mailed on Sep. 9, 2016", Sep. 9, 2016, 13 pages.
U.S. Appl. No. 12/749,467, , "Notice of Allowance received for U.S. Appl. No. 12/749,467, mailed on Jun. 14, 2017", Jun. 14, 2017, 14 pages.
U.S. Appl. No. 13/011,374, , "Final Office Action received for U.S. Appl. No. 13/011,374, mailed on Sep. 20, 2012", Sep. 20, 2013, 3 pages.
U.S. Appl. No. 13/011,374, , "Final Office Action received for U.S. Appl. No. 13/011,374, mailed on Apr. 1, 2016", Apr. 1, 2016, 15 pages.
U.S. Appl. No. 13/011,374, , "Final Office Action received for U.S. Appl. No. 13/011,374, mailed on Jul. 15, 2013", Jul. 15, 2013, 12 pages.
U.S. Appl. No. 13/011,374, , "Non-Final Office Action received for U.S. Appl. No. 13/011,374, mailed on Dec. 14, 2012", Dec. 14, 2012, 12 pages.
U.S. Appl. No. 13/011,374, , "Non-Final Office Action received for U.S. Appl. No. 13/011,374, mailed on Mar. 3, 2017", Mar. 3, 2017, 10 pages.
U.S. Appl. No. 13/011,374, , "Non-Final Office Action received for U.S. Appl. No. 13/011,374, mailed on Nov. 9, 2015", Nov. 9, 2015, 16 pages.
U.S. Appl. No. 13/011,436, , "Final Office Action received for U.S. Appl. No. 13/011,436, mailed on Jun. 24, 2015", Jun. 24, 2015, 21 pages.
U.S. Appl. No. 13/011,436, , "Final Office Action received for U.S. Appl. No. 13/011,436, mailed on Mar. 7, 2014", Mar. 7, 2014, 13 pages.
U.S. Appl. No. 13/011,436, , "Non-Final Office Action received for U.S. Appl. No. 13/011,436, mailed on Jan. 14, 2015", Jan. 14, 2015, 12 pages.
U.S. Appl. No. 13/011,436, , "Non-Final Office Action received for U.S. Appl. No. 13/011,436, mailed on Jun. 20, 2013", Jun. 20, 2013, 10 pages.
U.S. Appl. No. 13/011,436, , "Non-Final Office Action received for U.S. Appl. No. 13/011,436, mailed on Jun. 24, 2016", Jun. 24, 2016, 25 pages.
U.S. Appl. No. 13/011,436, , "Restriction Requirement received for U.S. Appl. No. 13/011,436, mailed on May 14, 2013", May 14, 2013, 6 pages.
U.S. Appl. No. 13/011,510, , "Final Office Action received for U.S. Appl. No. 13/011,510, mailed on Mar. 19, 2012", Mar. 19, 2012, 13 pages.
U.S. Appl. No. 13/011,510, , "Non-Final Office Action received for U.S. Appl. No. 13/011,510, mailed on Oct. 11, 2011", Oct. 11, 2011, 13 pages.
U.S. Appl. No. 13/011,510, , "Notice of Allowance received for U.S. Appl. No. 13/011,510, mailed on Nov. 15, 2012", Nov. 15, 2012, 10 pages.
U.S. Appl. No. 13/073,911, , "Corrected Notice of Allowance received for U.S. Appl. No. 13/073,911, mailed on Oct. 2, 2013", Oct. 2, 2013, 2 pages.
U.S. Appl. No. 13/073,911, , "Notice of Allowance received for U.S. Appl. No. 13/073,911, mailed on Jan. 21, 2014", Jan. 21, 2014, 5 pages.
U.S. Appl. No. 13/073,911, , "Notice of Allowance received for U.S. Appl. No. 13/073,911, mailed on Jul. 19, 2013", Jul. 19, 2013, 8 pages.
U.S. Appl. No. 13/073,911, , "Notice of Allowance received for U.S. Appl. No. 13/073,911, mailed on Jun. 10, 2014", Jun. 10, 2014, 5 pages.
U.S. Appl. No. 13/073,911, , "Notice of Allowance received for U.S. Appl. No. 13/073,911, mailed on Sep. 18, 2013", Sep. 18, 2013, 6 pages.
U.S. Appl. No. 13/073,926, , "Advisory Action received for U.S. Appl. No. 13/073,926, mailed on May 5, 2015", May 5, 2015, 3 pages.
U.S. Appl. No. 13/073,926, , "Final Office Action received for U.S. Appl. No. 13/073,926, mailed on Feb. 26, 2015", Feb. 26, 2015, 25 pages.
U.S. Appl. No. 13/073,926, , "Final Office Action received for U.S. Appl. No. 13/073,926, mailed on Oct. 17, 2013", Oct. 17, 2013, 13 pages.
U.S. Appl. No. 13/073,926, , "Non-Final Office Action received for U.S. Appl. No. 13/073,926, mailed on Aug. 18, 2015", Aug. 18, 2015, 19 pages.
U.S. Appl. No. 13/073,926, , "Non-Final Office Action received for U.S. Appl. No. 13/073,926, mailed on Jul. 15, 2014", Jul. 15, 2014, 18 pages.
U.S. Appl. No. 13/073,926, , "Non-Final Office Action received for U.S. Appl. No. 13/073,926, mailed on May 21, 2013", May 21, 2013, 16 pages.
U.S. Appl. No. 13/073,926, , "Notice of Allowance received for U.S. Appl. No. 13/073,926, mailed on Mar. 22, 2016", Mar. 22, 2016, 14 pages.
U.S. Appl. No. 13/073,936, , "Final Office Action received for U.S. Appl. No. 13/073,936, mailed on Aug. 4, 2014", Aug. 4, 2014, 9 pages.
U.S. Appl. No. 13/073,936, , "Final Office Action received for U.S. Appl. No. 13/073,936, mailed on Oct. 30, 2013", Oct. 30, 2013, 12 pages.
U.S. Appl. No. 13/073,936, , "Non-Final Office Action received for U.S. Appl. No. 13/073,936, mailed on Apr. 4, 2014", Apr. 4, 2014, 9 pages.
U.S. Appl. No. 13/073,936, , "Non-Final Office Action received for U.S. Appl. No. 13/073,936, mailed on May 16, 2013", May 16, 2013, 13 pages.
U.S. Appl. No. 13/073,936, , "Notice of Allowance received for U.S. Appl. No. 13/073,936, mailed on Sep. 24, 2014", Sep. 24, 2014, 5 pages.
U.S. Appl. No. 13/250,490, , "Advisory Action received for U.S. Appl. No. 13/250,490, mailed on Feb. 6, 2014", Feb. 6, 2014, 3 pages.
U.S. Appl. No. 13/250,490, , "Final Office Action received for U.S. Appl. No. 13/250,490, mailed on Apr. 1, 2015", Apr. 1, 2015, 17 pages.
U.S. Appl. No. 13/250,490, , "Final Office Action received for U.S. Appl. No. 13/250,490, mailed on Nov. 29, 2013", Nov. 29, 2013, 13 pages.
U.S. Appl. No. 13/250,490, , "Non-Final Office Action received for U.S. Appl. No. 13/250,490, mailed on Aug. 11, 2014", Aug. 11, 2014, 14 pages.
U.S. Appl. No. 13/250,490, , "Non-Final office action received for U.S. Appl. No. 13/250,490, mailed on Jan. 12, 2016", Jan. 12, 2016, 17 pages.
U.S. Appl. No. 13/250,490, , "Non-Final Office Action received for U.S. Appl. No. 13/250,490, mailed on Jun. 27, 2013", Jun. 27, 2013, 9 pages.

(56) References Cited

OTHER PUBLICATIONS

U.S. Appl. No. 13/250,490, , "Restriction Requirement received for U.S. Appl. No. 13/250,490, mailed on Feb. 28, 2013", Feb. 28, 2013, 6 pages.
U.S. Appl. No. 13/624,599, , "Advisory Action received for U.S. Appl. No. 13/624,599, mailed on Jul. 17, 2015", Jul. 17, 2015, 4 pages.
U.S. Appl. No. 13/624,599, , "Final Office Action received for U.S. Appl. No. 13/624,599, mailed on Apr. 24, 2015", Apr. 24, 2015, 19 pages.
U.S. Appl. No. 13/624,599, , "Final Office Action received for U.S. Appl. No. 13/624,599, mailed on Jun. 14, 2016", Jun. 14, 2016, 26 pages.
U.S. Appl. No. 13/624,599, , "Non-Final Office Action received for U.S. Appl. No. 13/624,599, mailed on Dec. 24, 2015", Dec. 24, 2015, 23 pages.
U.S. Appl. No. 13/624,599, , "Non-Final Office Action received for U.S. Appl. No. 13/624,599, mailed on Jun. 6, 2014", Jun. 6, 2014, 16 pages.
U.S. Appl. No. 13/691,390, , "Restriction Requirement received for U.S. Appl. No. 13/691,390, mailed on Feb. 26, 2015", Feb. 26, 2015, 9 pages.
U.S. Appl. No. 13/852,879, , "Corrected Notice of Allowability received for U.S. Appl. No. 13/852,879, mailed on May 1, 2017", May 1, 2017, 8 pages.
U.S. Appl. No. 13/852,879, , "Non-Final Office Action received for U.S. Appl. No. 13/852,879, mailed on Nov. 10, 2016", Nov. 10, 2016, 13 pages.
U.S. Appl. No. 13/852,879, , "Notice of Allowance received for U.S Appl. No. 13/852,879, mailed on Apr. 18, 2017", Apr. 18, 2017, 7 pages.
U.S. Appl. No. 13/852,879, , "Notice of Allowance received for U.S. Appl. No. 13/852,879, mailed on Aug. 25, 2017", Aug. 25, 2017, 7 pages.
U.S. Appl. No. 14/133,455, , "Corrected Notice of Allowance received for U.S. Appl. No. 14/133,455, mailed on Jun. 4, 2015", Jun. 4, 2015, 4 pages.
U.S. Appl. No. 14/133,455, , "Non-Final Office Action received for U.S. Appl. No. 14/133,455, mailed on Dec. 5, 2014", Dec. 5, 2014, 6 pages.
U.S. Appl. No. 14/133,455, , "Notice of Allowance received for U.S. Appl. No. 14/133,455, mailed on Apr. 27, 2015", Apr. 27, 2015, 6 pages.
U.S. Appl. No. 14/133,455, , "Notice of Allowance received for U.S. Appl. No. 14/133,455, mailed on Sep. 24, 2015", Sep. 24, 2015, 6 pages
U.S. Appl. No. 14/329,837, , "Non-Final Office Action received for U.S. Appl. No. 14/329,837, mailed on Apr. 8, 2016", Apr. 8, 2016, 7 pages.
U.S. Appl. No. 14/329,837, , "Notice of Allowance received for U.S. Appl. No. 14/329,837, mailed on Jun. 21, 2016", Jun. 21, 2016, 7 pages.
U.S. Appl. No. 15/266,093, , "Corrected Notice of Allowance received for U.S. Appl. No. 15/266,093, mailed on May 5, 2017", May 5, 2017, 11 pages.
U.S. Appl. No. 15/266,093, , "Notice of Allowance received for U.S. Appl. No. 15/266,093, mailed on Mar. 10, 2017", Mar. 10, 2017, 9 pages.
U.S. Appl. No. 15/655,003, , "Advisory Action Received for U.S. Appl. No. 15/655,003, mailed on Nov. 3, 2020", Nov. 3, 2020, 3 pages.
U.S. Appl. No. 15/655,003, , "Corrected Notice Of Allowability received for U.S. Appl. No. 15/655,003, mailed on Apr. 14, 2022", Apr. 14, 2022, 2 pages.
U.S. Appl. No. 15/655,003, , "Corrected Notice of Allowability received for U.S. Appl. No. 15/655,003, mailed on Mar. 23, 2022", Mar. 23, 2022, 3 pages.
U.S. Appl. No. 15/655,003, , "Final Office Action received for U.S. Appl. No. 15/655,003, mailed on Aug. 17, 2020", Aug. 17, 2020, 20 pages.
U.S. Appl. No. 15/655,003, , "Final Office Action Received for U.S. Appl. No.15/655,003, mailed on Jun. 30, 2021", Jun. 30, 2021, 11 pages.
U.S. Appl. No. 15/655,003, , "Non-Final Office Action received for U.S. Appl. No.15/655,003, mailed on Jan. 21, 2021", Jan. 21, 2021, 23 pages.
U.S. Appl. No. 15/655,003, , "Notice Of Allowability Received for U.S. Appl. No. 15/655,003, mailed on Feb. 3, 2022", Feb. 3, 2022, 2 pages.
U.S. Appl. No. 15/655,003, , "Notice of Allowance Received for U.S. Appl. No. 15/655,003, mailed on Jan. 7, 2022", Jan. 7, 2022, 17 pages.
U.S. Appl. No. 15/655,003, , "Notice of Allowance received for U.S. Appl. No. 15/655,003, mailed on Aug. 4, 2022", Aug. 4, 2022, 9 pages.
U.S. Appl. No. 15/655,003, , "Notice of Allowance received for U.S. Appl. No. 15/655,003, mailed on Nov. 10, 2022", Nov. 10, 2022, 9 pages.
U.S. Appl. No. 15/656,410, , "Notice Of Allowance received for U.S. Appl. No. 15/656,410, mailed on Aug. 30, 2019", Aug. 30, 2019, 7 pages.
U.S. Appl. No. 15/841,805, , "Advisory Action Received for U.S. Appl. No. 15/841,805, mailed on Jun. 12, 2020", Jun. 12, 2020, 2 pages.
U.S. Appl. No. 15/841,805, , "Corrected Notice of Allowability Received for U.S. Appl. No. 15/841,805, mailed on Mar. 3, 2022", Mar. 3, 2022, 2 pages.
U.S. Appl. No. 15/841,805, , "Final Office Action Received For U.S. Appl. No. 15/841,805, mailed on Apr. 17, 2020", Apr. 17, 2020, 11 pages.
U.S. Appl. No. 15/841,805, , "Final Office Action Received For U.S. Appl. No. 15/841,805, mailed on Feb. 8, 2021", Feb. 8, 2021, 16 pages.
U.S. Appl. No. 15/841,805, , "Non Final Office Action Received for U.S. Appl. No. 15/841,805, mailed on Dec. 19, 2019", Dec. 19, 2019, 10 pages.
U.S. Appl. No. 15/841,805, , "Non Final Office Action Received for U.S. Appl. No. 15/841,805, mailed on Jun. 25, 2021", Jun. 25, 2021, 5 pages.
U.S. Appl. No. 15/841,805, , "Non-Final Office Action Received for U.S. Appl. No. 15/841,805, mailed on Aug. 13, 2020", Aug. 13, 2020, 15 pages.
U.S. Appl. No. 15/841,805, , "Notice Of Allowance received for U.S. Appl. No. 15/841,805, mailed on Nov. 23, 2021", Nov. 23, 2021, 8 pages.
U.S. Appl. No. 16/707,467, , "Corrected Notice Of Allowability received for U.S. Appl. No. 16/707,467, mailed on Aug. 13, 2021", Aug. 13, 2021, 2 pages.
U.S. Appl. No. 16/707,467, , "Non Final Office Action Received for U.S. Appl. No. 16/707,467, mailed on Mar. 4, 2021", Mar. 4, 2021, 10 pages.
U.S. Appl. No. 16/707,467, , "Notice of Allowance Received for U.S. Appl. No. 16/707,467, mailed on May 12, 2021", May 12, 2021, 8 pages.
U.S. Appl. No. 17/565,307, filed Aug. 15, 2023, , "Final Office Action", U.S. Appl. No. 17/565,307, filed Aug. 15, 2023, 22 pages.
U.S. Appl. No. 17/565,307, , "Final Office Action Received for U.S. Appl. No. 17/565,307, Mailed on Aug. 15, 2023", Aug. 15, 2023, 23 pages.
U.S. Appl. No. 17/565,307, , "Non-Final Office Action Received for U.S. Appl. No. 17/565,307, mailed on Mar. 28, 2023", Mar. 28, 2023, 21 pages.
U.S. Appl. No. 17/565,307, , "Notice of Allowability Received for U.S. Appl. No. 17/565,307, mailed on Jan. 24, 2024", Jan. 24, 2024, 3 pages.
U.S. Appl. No. 17/565,307, filed Dec. 20, 2023, , "Notice of Allowance", U.S. Appl. No. 17/565,307, filed Dec. 20, 2023, 14 pages.
U.S. Appl. No. 17/565,307, , "Notice of Allowance Received for U.S. Appl. No. 17/565,307, mailed on Dec. 20, 2023", Dec. 20, 2023, 15 pages.

(56) References Cited

OTHER PUBLICATIONS

U.S. Appl. No. 17/565,307, filed Jan. 24, 2024, , "Supplemental Notice of Allowability", U.S. Appl. No. 17/565,307, filed Jan. 24, 2024, 3 pages.
2,804,052, , "Notice of Allowance received for Canadian Patent Application No. 2,804,052, mailed on Sep. 8, 2016", Sep. 8, 2016, 1 page.
2,804,052, , "Office Action received for Canadian Patent Application No. 2,804,052, mailed on Nov. 25, 2014", Nov. 25, 2014, 4 pages.
2,849,970, , "Office Action received for Canadian Patent Application No. 2,849,970, mailed on Oct. 5, 2015", Oct. 5, 2015, 3 pages.
2011299401, , "First Examination Report received for Australian Patent Application No. 2011299401, mailed on Sep. 27, 2013", Sep. 27, 2013, 3 pages.
2011299401, , "Notice of Acceptance received for Australian Patent Application No. 2011299401, mailed on Apr. 17, 2014", Apr. 17, 2014, 2 pages.
201180033079.2, , "Office Action received for Chinese Patent Application No. 201180033079.2, issued on Jun. 2, 2016", Jun. 2, 2016, 13 pages.
201180033079.2, , "Office Action received for Chinese Patent Application No. 201180033079.2, mailed on Dec. 22, 2015", Dec. 22, 2015, 22 pages.
2012155513, , "Notice of Allowance received for Russian Federation Application No. 2012155513, mailed on Feb. 10, 2016", Feb. 10, 2016, 12 pages.
2012155513, , "Office Action received for Russian Federation Patent Application No. 2012155513, mailed on Jul. 16, 2015", Jul. 16, 2015, 7 pages.
2012318961, , "Office Action received for Australian Patent Application No. 2012318961, mailed on Mar. 5, 2015", Mar. 5, 2015, 3 pages.
2012318961, , "Subsequent Examiner Report received for Australian Patent Application No. 2012318961, mailed on Jul. 21, 2015", Jul. 21, 2015, 3 pages.
201280059512.4, , "Office Action received for Chinese Patent Application No. 201280059512.4, mailed on May 27, 2016", May 27, 2016, 24 pages.
2014206199, , "Notice of Acceptance received for Australian Patent Application No. 2014206199, mailed on Aug. 12, 2016", Aug. 12, 2016, 2 pages.
2014206199, , "Office Action received for Australian Patent Application No. 2014206199, mailed on Feb. 26, 2016", Feb. 26, 2016, 5 pages.
201611209571.1, , "Decision of Rejection received for Chinese Patent Application No. 201611209571.1 mailed on Feb. 5, 2021", Feb. 5, 2021, 2 pages.
201611209571.1, , "Office Action Received for Chinese Patent Application No. 201611209571.1, mailed on Mar. 24, 2020", Mar. 24, 2020, 10 pages.
201611209571.1, , "Office Action Received for Chinese Patent Application No. 201611209571.1, mailed on May 28, 2020", May 28, 2020, 12 pages.
2016117291, , "Office Action received for Russian Federation Patent Application No. 2016117291, mailed on Mar. 29, 2017", Mar. 29, 2017, 12 pages.
2804052, , "Office Action received for Canadian Patent Application No. 2,804,052, mailed on Oct. 26, 2015", Oct. 26, 2015, 3 pages.
2804052, , "Office Action received for Chinese Patent Application No. 2,804,052, mailed on Nov. 25, 2014", Nov. 25, 2014, 3 pages.
U.S. Appl. No. 61/171,000, filed Apr. 20, 2009, , "U.S. Appl. No. 61/171,000, filed Apr. 20, 2009".
U.S. Appl. No. 61/250,326, filed Oct. 9, 2009, , "U.S. Appl. No. 61/250,326, filed Oct. 9, 2009.".
U.S. Appl. No. 61/250,326, filed Oct. 9, 2009, , "U.S. Appl. No. 61/250,326, filed Oct. 9, 2009", Oct. 9, 2009, 31 pages.
U.S. Appl. No. 61/710,000, filed Apr. 20, 2009, , "U.S. Appl. No. 61/710,000, filed Apr. 20, 2009", Apr. 20, 2009, 79 pages.

Admiral Metals, , "Reflecting on the History of Customer Service", Retrieved from the Internet URL: <https://www.admiralmetals.com/admiral-care/reflecting-history-customer-service/>, Dec. 10, 2014, 2 pages.
Boshoff, et al., , "The mediating effect of brand image and information search intentions on the perceived risks associated with online purchasing on a generically-branded website", Management Dynamics 18.4: 18-28, 2009 (Year: 2009), 2009, 9 pages.
Clark, James , "Simplicity Itself", Commercial Motor, Mar. 11, 2010, 1 page.
Clippard, et al., "Automatic Method To Generate Product Attributes Based Solely On Product Images", 96 pages.
Ebay Inc, , "EBay Asks Its Users for Help Building New Search Tools", New York Times Company, Feb. 9, 2010, 2 pages.
Google Play, , "Moovit-Real-time Transit Info.—Android Apps on Google Play", "Retrieved from the Internet: <URL: https://play.google.com/store/apps/details?id=com .tranzmate&hl=en>,", Aug. 2, 2017, 2 pages.
Huang, et al., , "Segmentation of color textures using K-means cluster based wavelet image fusion", Applied Mechanics and Materials vols. 20-23, 2010, pp. 209-214.
Meyer, et al., , "Multiscale Morphological Segmentations Based on Watershed, Flooding, and Eikonal PDE", M. Nielsen et al. (Eds.): Scale-Space'99, LNCS 1682, 1999, pp. 351-362.
PCT/US2011/049444, , "International Preliminary Report on Patentability received for PCT Application No. PCT/US2011/049444, mailed on Dec. 4, 2014", Dec. 4, 2014, 7 pages.
PCT/US2011/049444, , "International Search Report received for PCT Application No. PCT/US2011/049444, mailed on Nov. 18, 2014", Nov. 18, 2014, 2 pages.
PCT/US2011/049444, , "International Written Opinion received for PCT Application No. PCT/US2011/049444, mailed on Nov. 18, 2014", Nov. 18, 2014, 5 pages.
PCT/US2011/049449, , "International Preliminary Report on Patentability received for PCT Application No. PCT/US2011/049449, mailed on Mar. 14, 2013", Mar. 14, 2013, 8 pages.
PCT/US2011/049449, , "International Search Report received for PCT Application No. PCT/US2011/049449, mailed on Jan. 19, 2012", Jan. 19, 2012, 2 pages.
PCT/US2011/049449, , "International Written Opinion received for PCT Application No. PCT/US2011/049449, mailed on Jan. 19, 2012", Jan. 19, 2012, 6 pages.
PCT/US2011/049454, , "International Preliminary Report on Patentability received for PCT Application No. PCT/US2011/049454, mailed on Jan. 8, 2015", Jan. 8, 2015, 7 pages.
PCT/US2011/049454, , "International Search Report received for PCT Application No. PCT/US2011/049454, mailed on Nov. 28, 2014", Nov. 28, 2014, 2 pages.
PCT/US2011/049454, , "International Written Opinion received for PCT Application No. PCT/US2011/049454, mailed on Nov. 28, 2014", Nov. 28, 2014, 5 pages.
PCT/US2012/057110, , "International Preliminary Report on Patentability received for PCT Application No. PCT/US2012/057110, mailed on Apr. 17, 2014", Apr. 17, 2014, 7 pages.
PCT/US2012/057110, , "International Search Report received for PCT Application No. PCT/US2012/057110, mailed on Nov. 30, 2012", Nov. 30, 2012, 2 pages.
PCT/US2012/057110, , "Written Opinion received for PCT Application No. PCT/US2012/057110, mailed on Nov. 30, 2012", Nov. 30, 2012, 5 pages.
PCT/US2012/058101, , "International Written Opinion received for PCT Patent Application No. PCT/US2012/058101, mailed on Nov. 29, 2012", Nov. 29, 2012, 4 pages.
PCT/US2012/058101, , "Search Report received for PCT Patent Application No. PCT/US2012/058101, mailed on Nov. 29, 2012", Nov. 29, 2012, 2 pages.
PCT/US2013/072339, , "International Search Report received for PCT Application No. PCT/US2013/072339, mailed on Apr. 28, 2014", Apr. 28, 2014, 5 pages.
PCT/US2013/072339, , "Invitation to Pay Additional Fees and Partial Search Report received for PCT Application No. PCT/US2013/072339, mailed on Feb. 14, 2014", Feb. 14, 2014, 2 pages.

(56) References Cited

OTHER PUBLICATIONS

PCT/US2013/072339, , "Written Opinion received for PCT Application No. PCT/US2013/072339, mailed on Apr. 28, 2014", Apr. 28, 2014, 5 pages.
PCT/US2015/039044, , "International Search Report received for PCT Application No. PCT/US2015/039044, mailed on Sep. 21, 2015", Sep. 21, 2015, 3 pages.
PCT/US2015/039044, , "Written Opinion received for PCT Application No. PCT/US2015/039044, mailed on Sep. 21, 2015", Sep. 21, 2015, 9 pages.
Rosenberg, , "Query Image Search", 79 pages.
Rui, et al., "A Novel Relevance Feedback Technique In Image Retrieval", Proceedings of the seventh ACM International Conference on Multimedia, Oct. 1999, pp. 67-70.
Silhouette, , "Define Silhouette at Dictionary.com", https://www.dictionary.com/browse/silhouette?s=t?s=t, Jul. 13, 2012, 2 pages.
Wayback Machine, , "www.macys.com", Retrieved Online from the Internet URL: <www.archive.org>, Dec. 31, 2010, 11 pages.
Wikipedia, , "Recommender System", Jul. 10, 2014, 8 pages.

* cited by examiner

METHODS AND SYSTEMS FOR REDUCING ITEM SELECTION ERROR IN AN E-COMMERCE ENVIRONMENT

RELATED APPLICATIONS

This Application is a continuation of and claims priority to U.S. patent application Ser. No. 17/565,307, filed Dec. 19, 2021, which claims priority to U.S. patent application Ser. No. 15/655,003, filed Jul. 20, 2017, which is now U.S. Pat. No. 11,605,116, issued on Mar. 14, 2023, which claims priority to U.S. patent application Ser. No. 12/749,467, filed Mar. 29, 2010, which is now U.S. Pat. No. 9,792,638, issued on Oct. 17, 2017, the entire disclosures of which are hereby incorporated by reference in their entireties.

TECHNICAL FIELD

The present disclosure generally relates to data processing techniques. More specifically, the present disclosure relates to methods and systems for displaying, to a user interface, item listings for the user to select from for querying the system, in order to enable the system to return to the user images of the type of item desired by the user for possible purchase.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come into existence. The business models utilized by enterprises operating online are almost as varied as the products and services offered. For instance, some products and services are offered at fixed prices, while others are offered via various transaction methods, and still others are offered via a system of classified ad listings. Some enterprises specialize in the selling of a specific category of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of item listings that satisfy the potential buyer's query far exceeds the number of item listings that can practically be presented on a search results page. Furthermore, when a buyer selects from a user interface an item of interest by textual name of that item, a selection error can occur. That is, the buyer might select the incorrect name of the product, such as selecting a clutch handbag when an evening handbag is really desired. Preventing that error and providing the buyer with an image of the precise type of item he or she is looking for enhances the buyer's experience and is more likely to lead to an executed transaction.

BRIEF DESCRIPTION OF THE DRA WINGS

Some embodiments are illustrated by way of example and not limitation in the figures of the accompanying drawings, in which:

FIGS. 4A-4F illustrate an example of a method for displaying images of item listings i n a user interface, for another brand of product.

FIG. 5A-5D illustrate an example of a method for displaying images of item listings, for yet another brand of product.

DETAILED DESCRIPTION

Overview

Methods and systems for displaying, at a user interface, item listings for the user to select from for querying the system, in order to enable the system to return to the user interface items of the type desired by the user for possible purchase. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
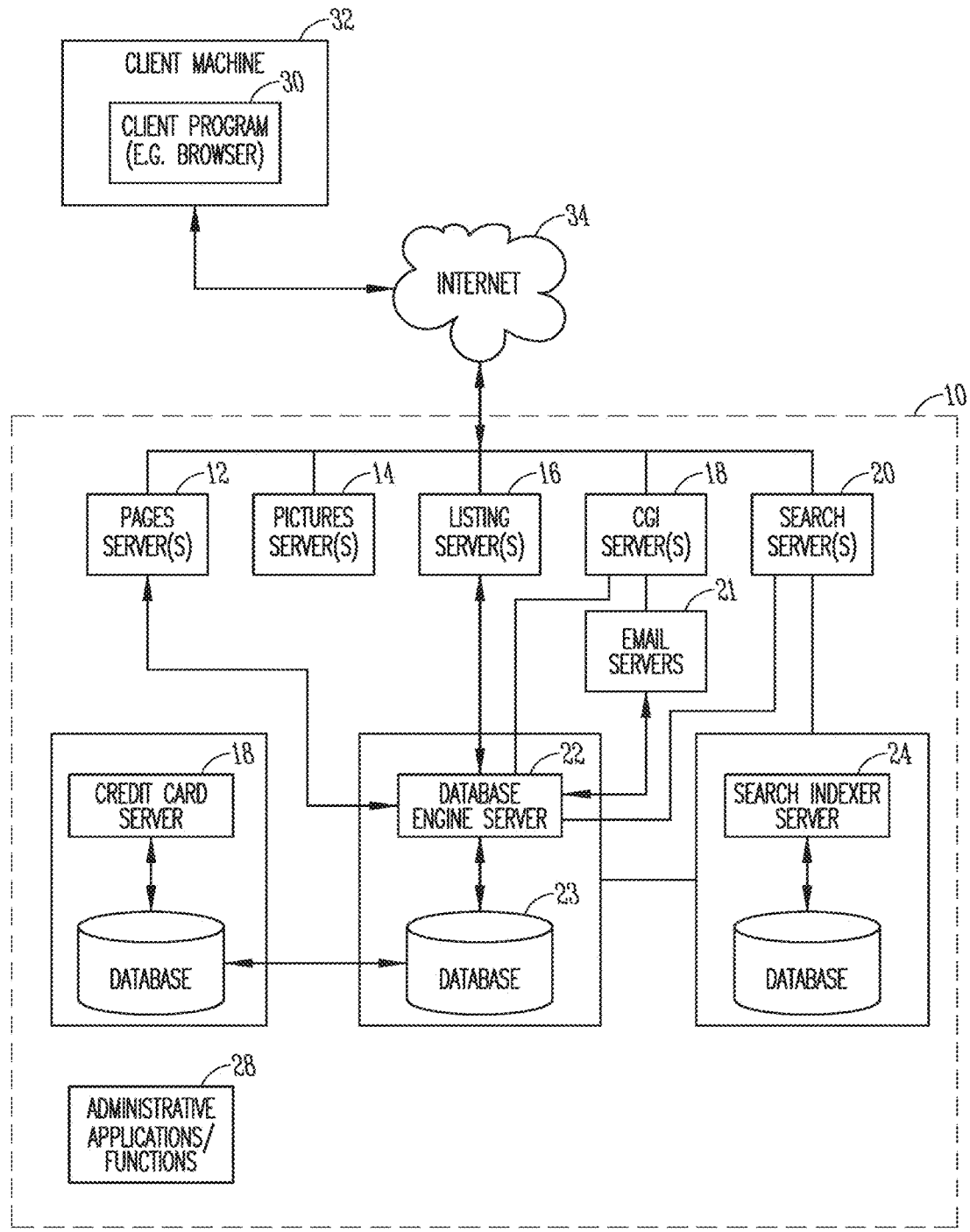
FIG. 1 is a block diagram of a network environment including a network-connected client system and server system, with which an embodiment of the invention might be implemented.
Figure 2:
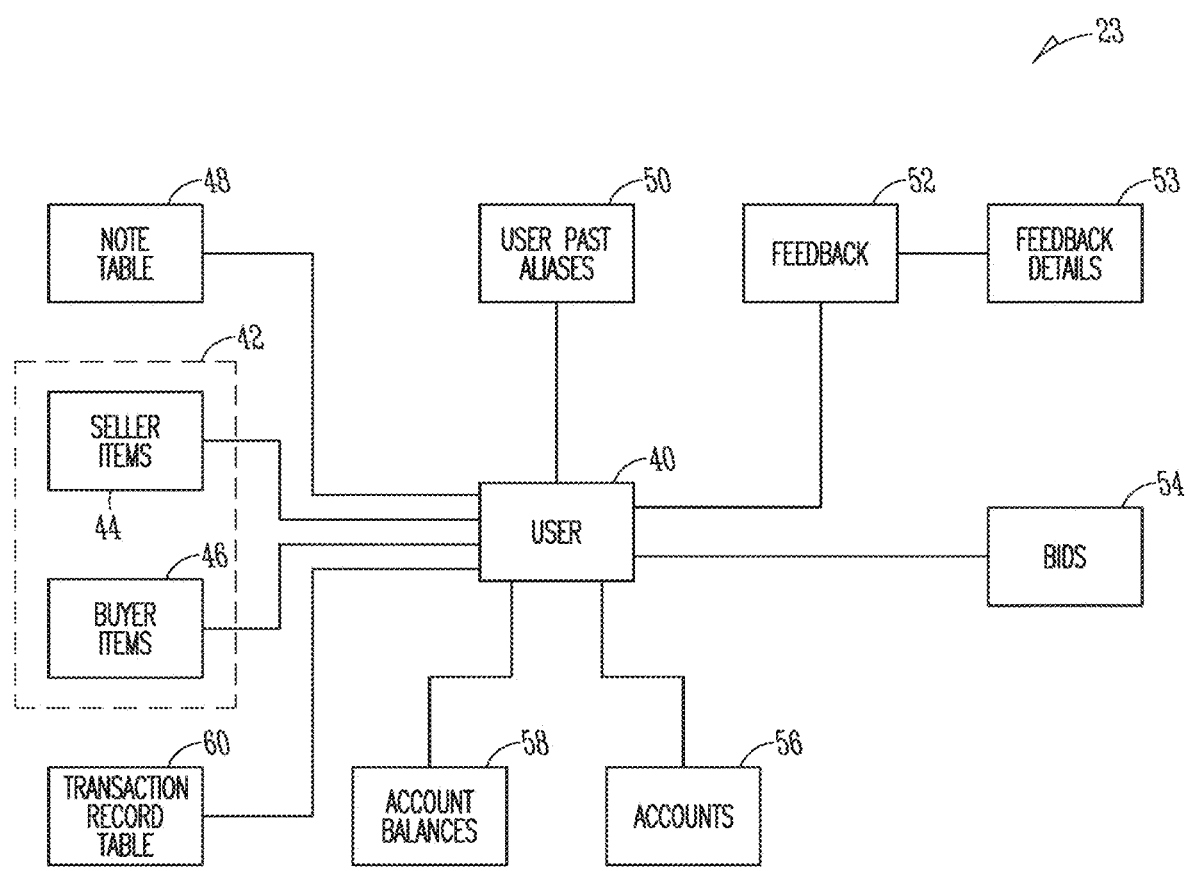
FIG. 2 illustrates is a database diagram illustrating an exemplary database for the transaction facility.

To better understand the invention, an embodiment of an electronic transaction facility is shown in FIGS. 1 and 2.

FIG. 1 is a block diagram illustrating an exemplary network-based transaction facility in the form of an Internet-based transaction facility 10. While an exemplary embodiment of the present invention is described within the context of an transaction facility, it will be appreciated by those skilled in the art that the invention will find application in many different types of computer-based, and network-based, commerce facilities. It will also be appreciated by those skilled in the art that the invention may be used in transaction facilities of other architectures. The instructions stored in the transaction facility (which can be executed by a processor) can be stored on a machine-readable medium including, but not limited to read only memory (ROM), random access memory (RAM), magnetic disk storage media, optical storage media, flash memory devices, or electrical, optical, acoustical or other form of propagated signals.

The transaction facility 10 within which an embodiment can be implemented includes one or more of a number of types of front-end servers, namely page servers 12 that deliver web pages (e.g., markup language documents), picture sewers 14 that dynamically deliver images to be displayed within Web pages, listing servers 16, CGI servers 18 that provide an intelligent interface to the back-end of transaction facility 10, and search servers 20 that handle search requests to the transaction facility 10. E-mail servers 21 provide, inter alia, automated e-mail communications to users of the transaction facility 10.

The back-end servers include a database engine server 22, a search index server 24 and a credit card database server 26, each of which maintains and facilitates access to a respective database.

An on-line trading application may form a part of database engine server 22 discussed below. The on-line trading application may include an on-line trading module and item listing presentation management module, and is associated with database 23.

The Internet-based transaction facility 10 may be accessed by a client program 30, such as a browser (e.g., the Internet Explorer distributed by Microsoft Corp. of Redmond Washington) that executes on a client machine 32 and accesses the transaction facility 10 via a network such as, for example, the Internet 34. Other examples of networks that a client may utilize to access the transaction facility 10 include a wide area network (WAN), a local area network (LAN), a wireless network (e.g. a cellular network), or the Plain Old Telephone Service (POTS) (or PSTN) network.

Database Structure

FIG. 2 is a database diagram illustrating an exemplary database 23, maintained by and accessed via the database engine server 22, which at least partially implements and supports the transaction facility 10. The database 23 may, in one embodiment, be implemented as a relational database, and includes a number of tables having entries, or records, that are linked by indices and keys. In an alternative embodiment, the database 23 may be implemented as a collection of blocks in a block-oriented database. While FIG. 2 shows one embodiment of a database, it will be appreciated by those skilled in the art that the invention can be used with other database structures.

Central to the database 23 is a user table 40, which contains a record for each user of the transaction facility 10. A user may operate as a seller, buyer, or both, within transaction facility 10. The database 23 also includes item tables 42 that may be linked to the user table 40. Specifically, the item tables 42 include a seller items table 44 and a buyer items table 46. A user record in the user table 40 may be linked to multiple items that are being, or have been auctioned or otherwise marketed via the transaction facility 10. A link indicates whether the user is a seller or a buyer with respect to items for which records exist within the items tables 42. While offerings by the seller are referred to as "items" in the specification, "items" includes any product or service offered by the seller. The database 23 also includes a note table 48 populated with note records that may be linked to one or more item records within the item tables 42 and/or to one or more user records within the user table 40. Each note record within the note table 48 may include, inter alia, a comment, description, history or other information pertaining to an item being auctioned or otherwise sold via the transaction facility 10 or to a user of the transaction facility 10.

A number of other tables are also shown to be linked to the user table 40, namely a user past aliases table 50, a feedback table 52, a bids table 54, an accounts table 56, and an account balances table 58.

The on-line trading system includes a user interface which may the browser 30 whereby a user can enter select a search term describing an item the user is interested in seeing for possible purchase. Usually a buyer would like to browse a category of images, for example hand bags, by style and/or brand so that the user can quickly find something interesting to the buyer. The buyer selects one of the choices for the desired item and images of one or more of the category of item selected from the choices are returned for the buyer to see for possible purchase. For instance, a number of product type can be presented via the user interface by name, such as shoes, handbags, clothes, and the like. If the category of item the user desires is a handbag, the handbag selection presented to the buyer in textual form by the user interface might be the words "clutch," "evening bag," "messenger style," and "satchel," among others. It could occur that the user might confuse, as one example, "clutch" with "evening bag" and enter "clutch" as the category of bag desired when the user is actually looking for an evening bag. This would result in one or more images of a clutch being returned to the user, when the user actually wanted one or more images of an evening bag image to be returned. Thus the item image being returned to the user that is not the actual category of item the user desires, and the user's experience is therefore less than optimum. This in itself may result in the transaction not being executed.

If, on the other hand, the selection presented to the user is in visual form, such as a silhouette of the product, then there is much less room for error. The user will see an image of the category of handbag. Using the example next above, the user would see images of "clutch,' "evening bag," "messenger style," and "satchel." This could be, for example, presented by brand. The user could then, as only one example of an embodiment, mouseover each image to display the name of each of the various types of handbag offered for each image. Mouseover is a well-known function and an example, taken from Wikipedia, is seen in the appendix to this specification. The user could then click on the bag of the user's choice to view possible attributes of the bag such as styling, color and fabric, among others. Since the buyer will see images of the category of bag desired, with very little opportunity for error, the experience is more nearly optimum, and a transaction is more likely to be executed. This can be implemented, in one embodiment, by the images of types of handbags being presented to the user in silhouette so that the users could, for example, mouseover the silhouette image that is most like the category of bag desired and the title of the bag would be presented. For example, the user interface can present the prospective buyer with silhouettes of a clutch, an evening hag, a messenger style bag, and a satchel, among others. Seeing the silhouette images, the buyer can mouseover them for the name and simply select the silhouette of the category of bag desired, for example an evening bag, and the system displays the types of evening bags offered for sale. One of ordinary skill in the art will see that the displaying the title is not necessary for the invention. The user might just select the silhouette based on recognizing the silhouette. In this manner in which a buyer can find products or services which they wish to purchase. An example of general ways for a buyer to find products is seen in U.S. patent application Ser. No. 11/618,503 filed on Dec. 29, 2006, and incorporated herein by reference.

In response to the selection, information, including images and attributes of the selected silhouette can then be returned to the user interface for the user. In one embodiment this is accomplished by the system mapping the selected evening bag image information of this example to a textual value and making a query to the transaction facility 10 which will undertake a search using the query and will then obtain and return the foregoing image and attributes. In another embodiment, attributes of the images can be returned separately for presentation to the user by way of the user interface. The presentation of a silhouette of a category of product to the buyer, since it is visual, drastically reduces the opportunity for error, or error rate, makes the buyer's experience more nearly optimum, and is more likely to result in an executed transaction.

As another example, if the buyer is interested in women's shoes, various type of women's shoes will be presented in silhouette, such as high heels, pumps, flats, sandals, and the like. The user mouses over the silhouettes, again to display the name, as only one example, and clicks to select the category of shoe of interest from the silhouettes, for example, high heels. High heel shoes of various types and attributes can be returned to the buyer for possible purchase, much the same way handbags were returned in the above example. The various types of heels could be three-inch heels stilettos, Cuban heels, and the like. Attributes could be fabric, color, size, price and availability, among others can be displayed for the user.

In some embodiments, a user operates a web browser application 30 on a client machine 32 to interact with the transaction facility 10. A user may be presented with a search interface on client browser 30, with items in silhouette, as described generally above, and in more detail below, from which the user can select an item to be used in generating a search request submitted to the transaction facility. In some embodiments users themselves may be able to select certain item attributes. For example, the buyer may be interested in women's shoes. Certain type of women's shoes are provided to the user interface in visual representation as silhouettes. The buyer selects a category of shoe in silhouette, and, as a result, shoes of that category, with certain attributes, such as the color, fabric, size, price, and the like, will be returned for the user to see and possibly purchase. This can be implemented by the transaction facility 10, after receiving and processing the search request, communicating a response to the web browser application 30. The response could be obtained from a system of the type seen in U.S. patent application Ser. No. 12/749,458, filed on Mar. 29, 2010, entitled "METHODS AND SYSTEMS FOR IMPROVING THE CATEGORIZATION OF ITEMS FOR WHICH ITEM LISTINGS ARE MADE BY A USER OF AN ECOMMERCE SYSTEM", now abandoned, included herein by reference. The response could be, for example, an Internet document or web page that, when rendered by the browser application 30, displays a search results page showing one or more item listings, possibly with attributes, that satisfy the user's search request. The item listings are, in some embodiments, presented by a presentation module, which may be a web server or an application server.

In some embodiments, the search engine module, not shown but of a type well known in the industry could provide the actual search function. For instance, the search engine module, in some embodiments, receives and processes a search request to identify the item listings that satisfy the search request. It will be appreciated by those skilled in the art that a variety of search techniques might be implemented to identify item listings that satisfy a search request. In general, however, the item attributes of item listings are analyzed for the presence of the user-provided search terms. For instance, in some embodiments, selected silhouette can be converted to textual information and used to query system storage.

In an alternative embodiment, the search engine module may represent an interface to a search engine implemented as an external component or module, for example, as part of transaction facility 10, or as a separate external module. In such a scenario, the search engine module 48 may simply receive the set of item listings that satisfy a search query.

Figure 3A:
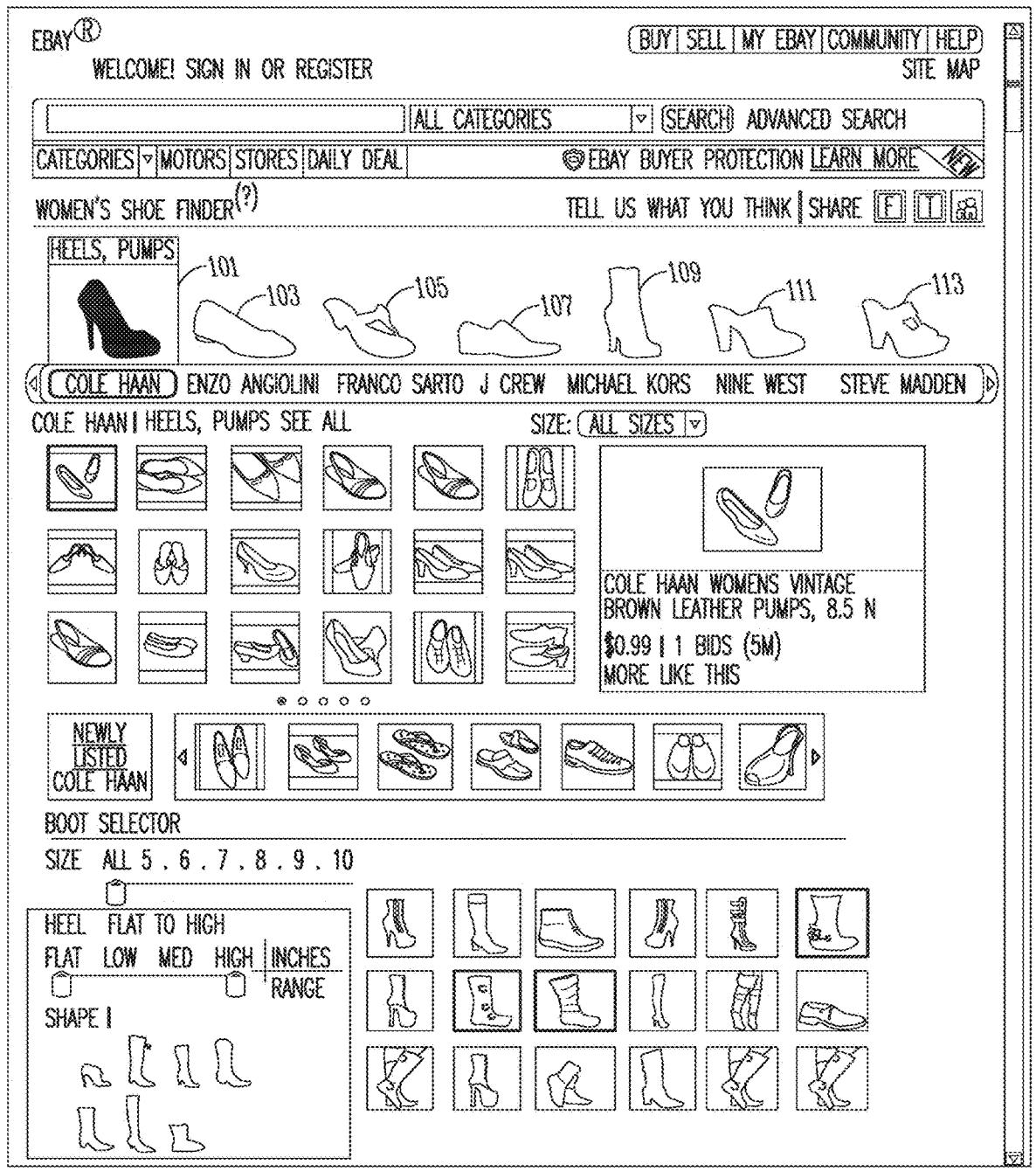
FIGS. 3A-3F illustrate an example of a method for buyer and displaying images of item listings in a user interface for one brand of product.
Figure 3B:
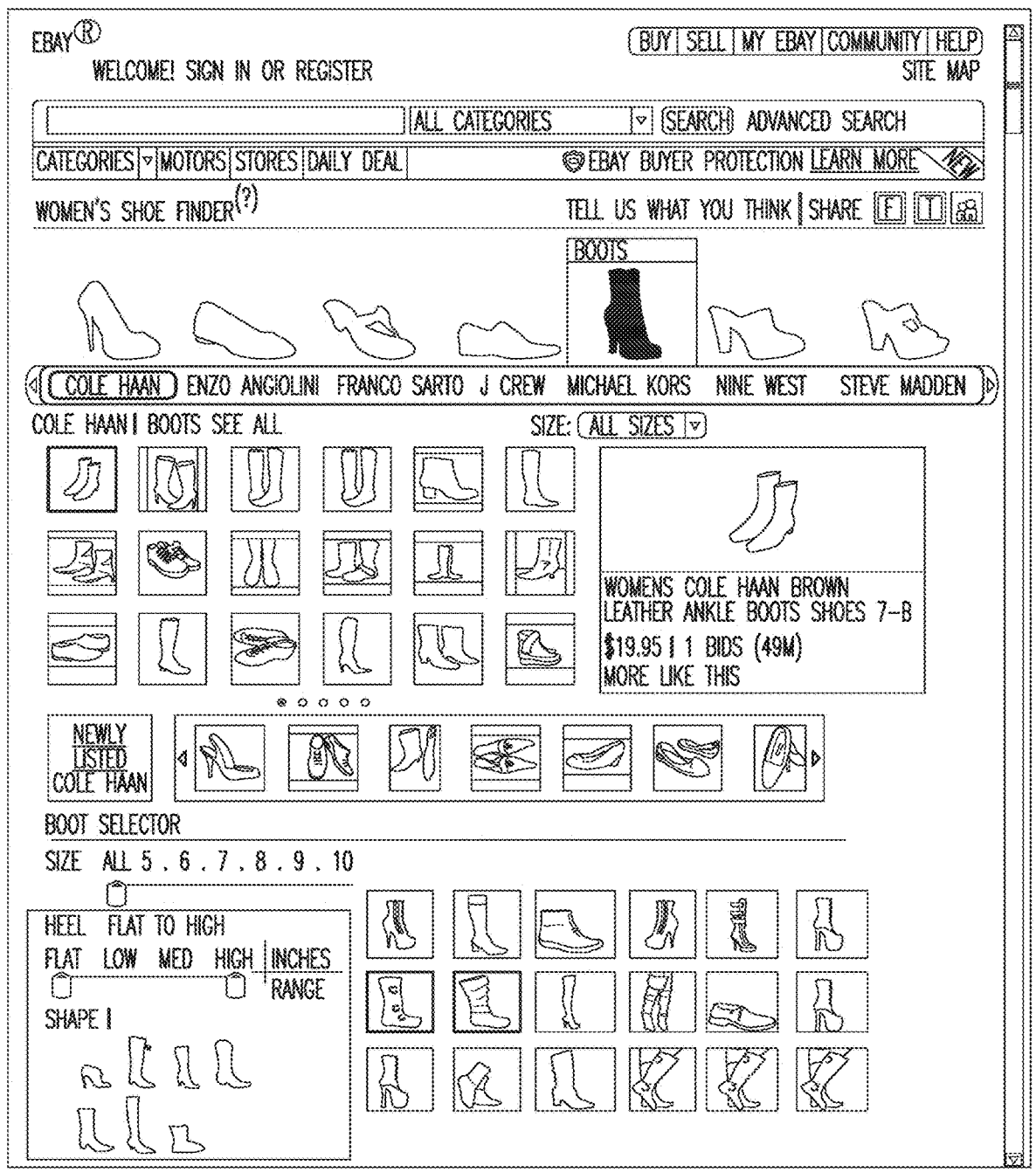

Turning now to FIG. 3A there is shown one embodiment in which a screen is presented to a prospective buyer, for example at the user interface 30. The screen in FIG. 3A shows type of shoes in silhouette form. A particular brand and category might be used as a default brand and category as one example for beginning the process. In this case the default brand is Cole Haan and the default category of shoe is Heels and Pumps. Those of ordinary skill in the art will recognize that a default category need not be used, but that other ways of beginning the process can be used. In silhouette form across the top of page are the various other types of shows offered by Cole Haan-heels and pumps 101, flats 103, sandals 105, loafers 107, boots 109, clogs 111, and platform heels 113. By mousing over each of these a selection indicator such as, in one embodiment, turning the silhouette blue, can give the user the name of the type of shoe. The user has the opportunity of selecting the shoe type illustrated by that silhouette. Clicking on the silhouette will then show all shoes of that type offered by Cole Haan. For example, clicking on one of these type, say boots 109 would show the types of boots offered by Cole Haan. This is seen in FIG. 3B. These images are, in one embodiment, retrieved from system storage by mapping the selected silhouette information to textual information to be used as, or as part of, a query for the storage. An example of mapping the image information to textual for forming a query is seen below. Any of the "See All" shoes in FIG. 3B can be clicked on and purchased. Examples of purchasing, and seeing attributes, such as size, material, price, and the like, are seen below.

Figure 3C:
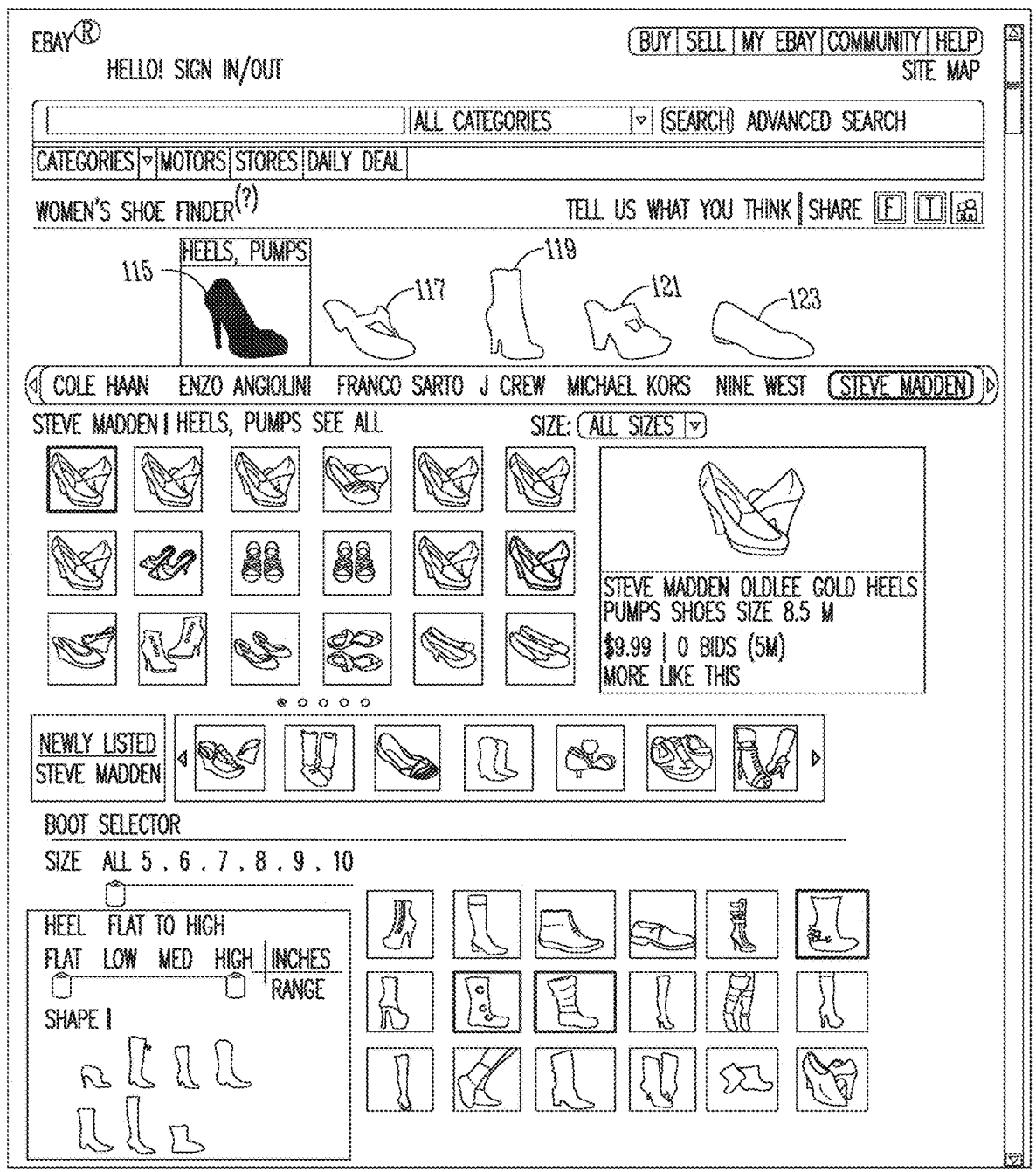
Figure 3D:
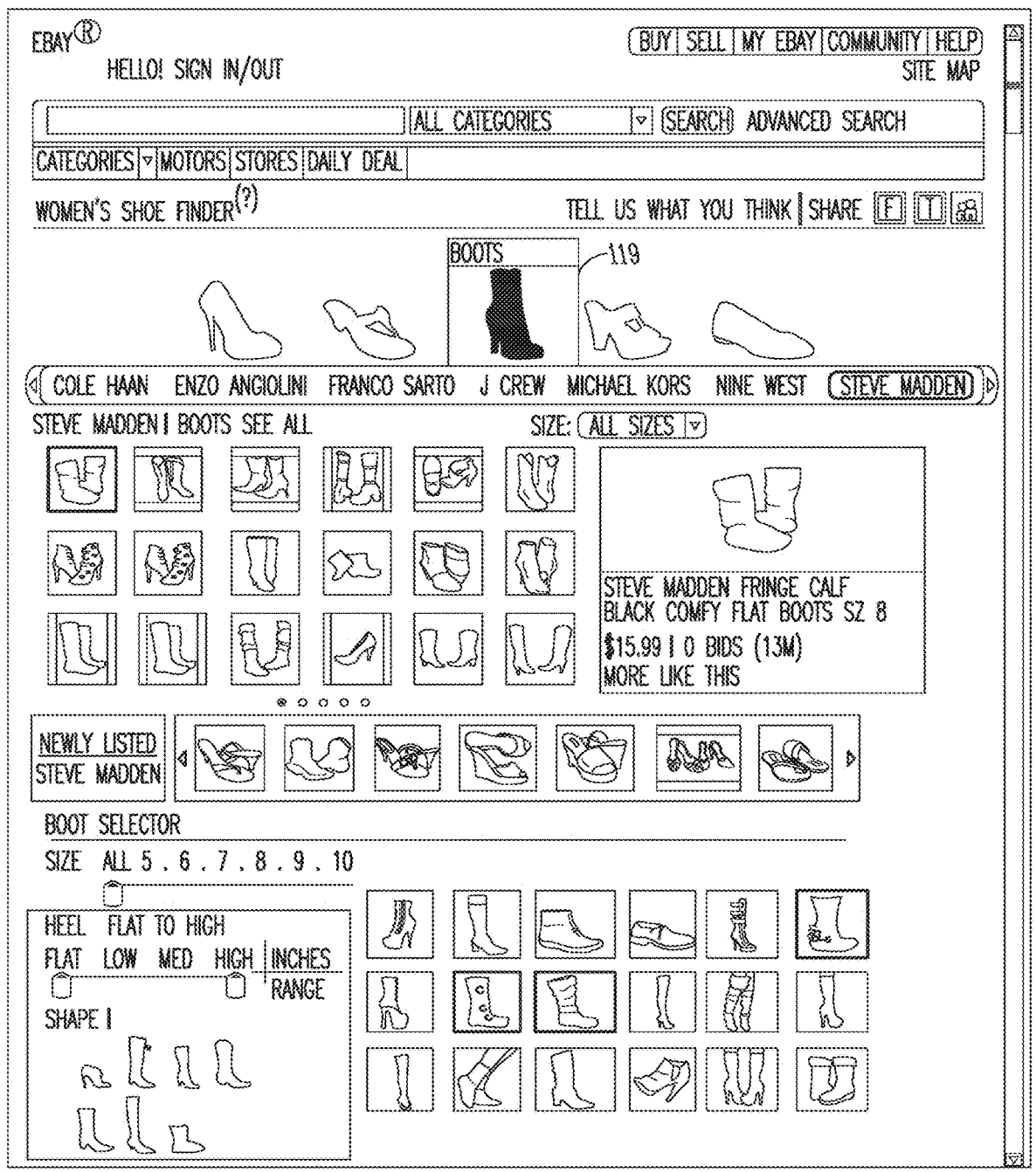
Figure 3E:
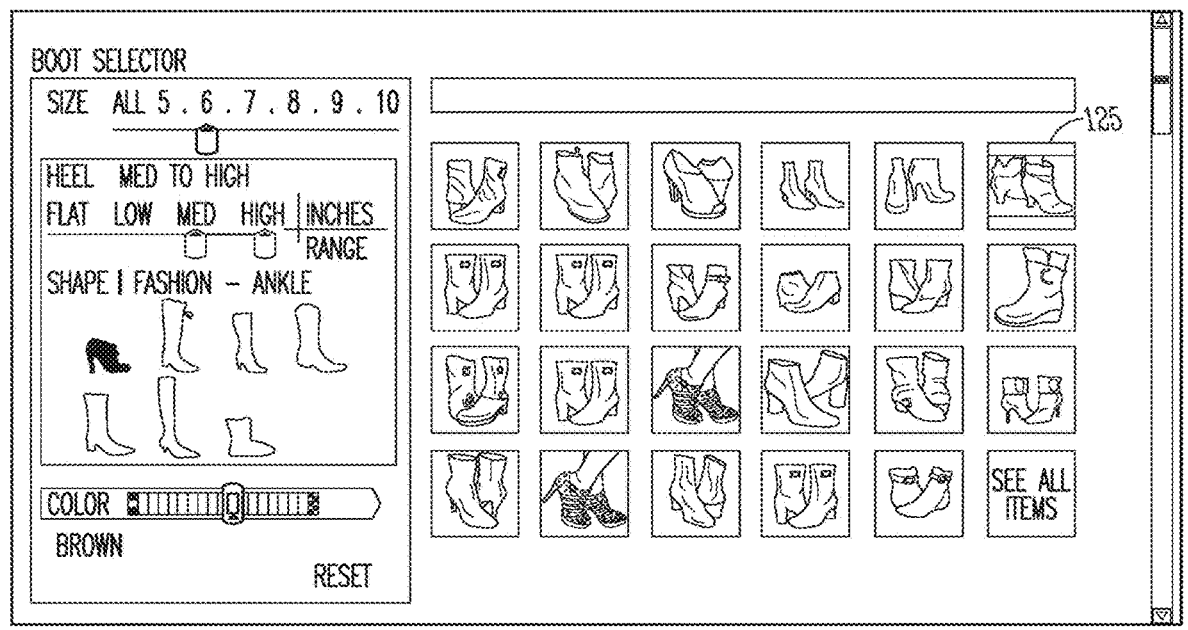
Figure 3F:

As seen in the FIGS. 3A and 3B, there are other brands offered. Clicking on other type would operate likewise. For example, clicking on Steve Madden in FIG. 3C shows in silhouette form the types of shoes offered by that brand-heel, pumps 115, sandals 117, boots 119, platforms 121, and Flats 123. Mousing over each of these silhouettes can cause, in this embodiment, the silhouette to turn blue in color and to list the type of shoe in words, for ease of viewing and understanding, ready for selection. As mentioned above, while this color change and listing in words is used in this embodiment, it is not necessary for the practice of the invention. Other ways of providing this function are within one of ordinary skill in the art without departing from the spirit or the scope of the invention. Then the appropriate silhouette is selected, for example, boots 119, and the system returns images of the boots offered by the Steve Madden brand as in FIG. 3D. Clicking then on an image of a desired boot can show attributes such as size, color, and the like, according to the designer's choice and implemented as is known in the art. An improved way of doing this is seen in FIG. 3E where the screen can also show silhouette of boot types such as ankle, knee-high, mid-calf, cowboy/western, classics, thigh/high, and snow/winter. Selecting, for example, size, color, heel type, and the desired silhouette would show an image of the boots offered for sale in that size, color, and heel type. One could then click on one of the desired type of boots, such as at 125, and obtain other sales information of interest including attributes such as size, price, color, material, and the like, as seen in FIG. 3F. In each case, selection of an image could cause the image data to be converted to textual data that can be used for, or as part of, the query to system storage to retrieve the information viewed by the user. A purchase or bid can then be made if desired and the purchase registered, or recorded, by the transaction facility.

Figure 4A:
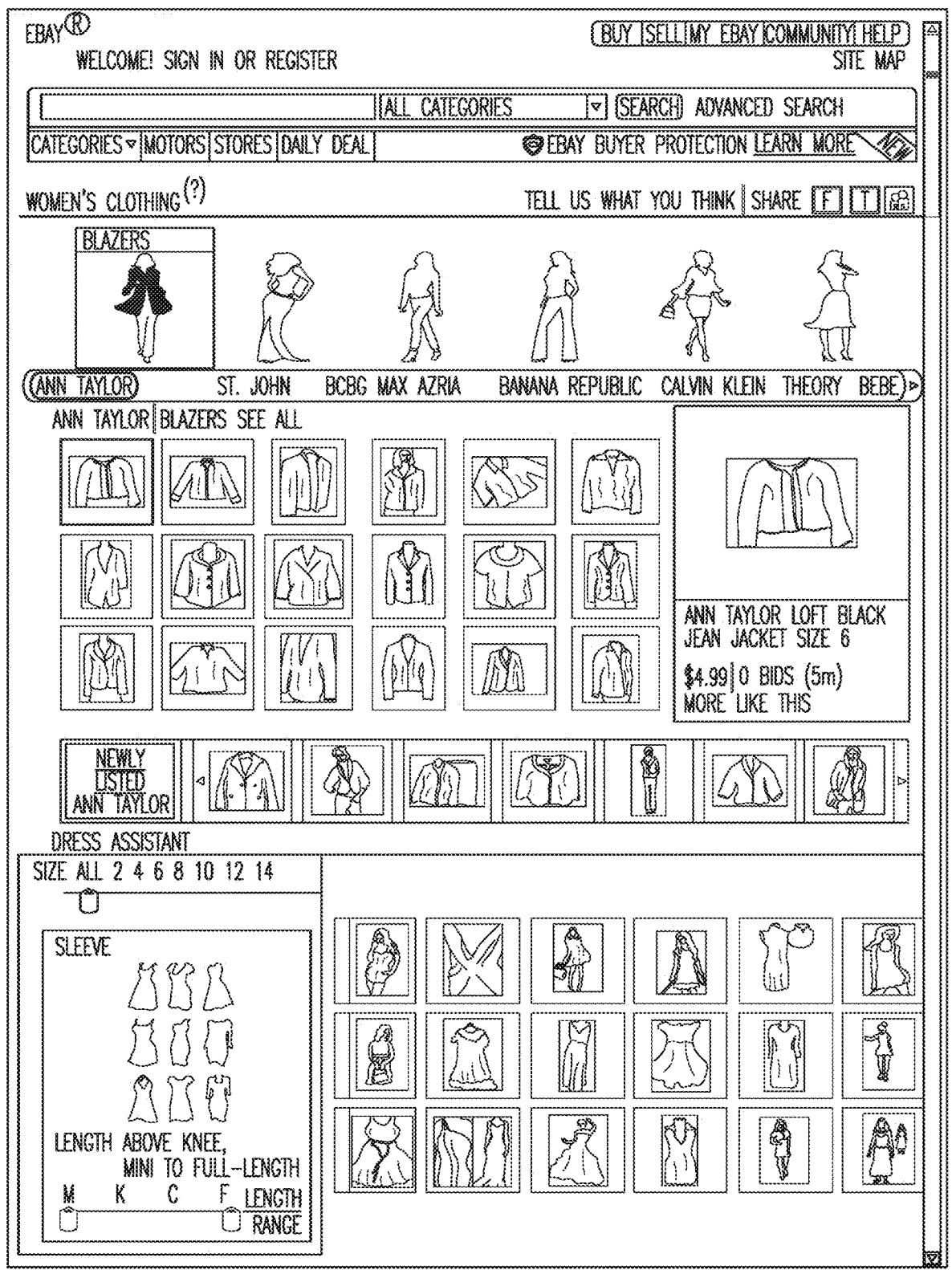
Figure 4B:
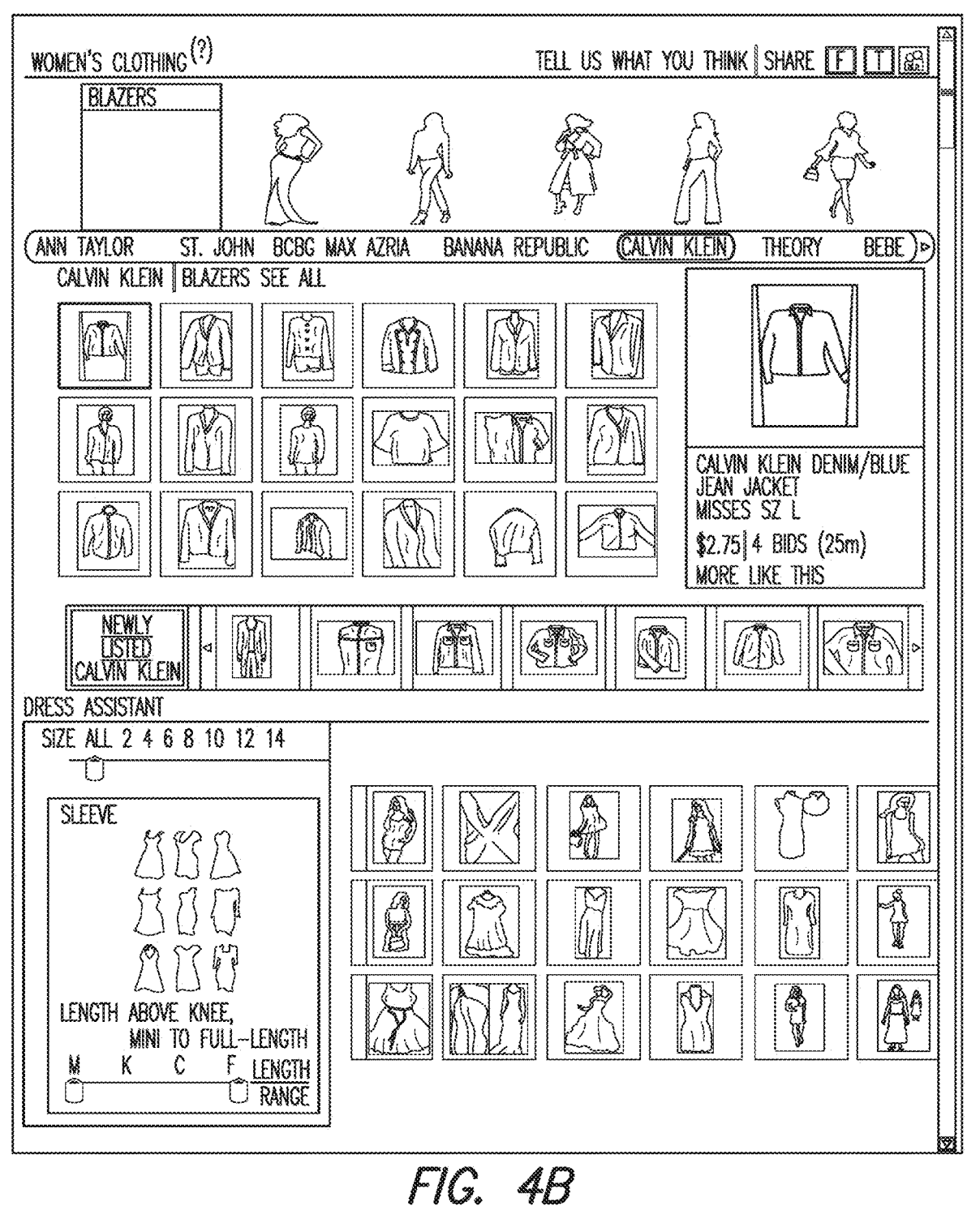
Figure 4C:
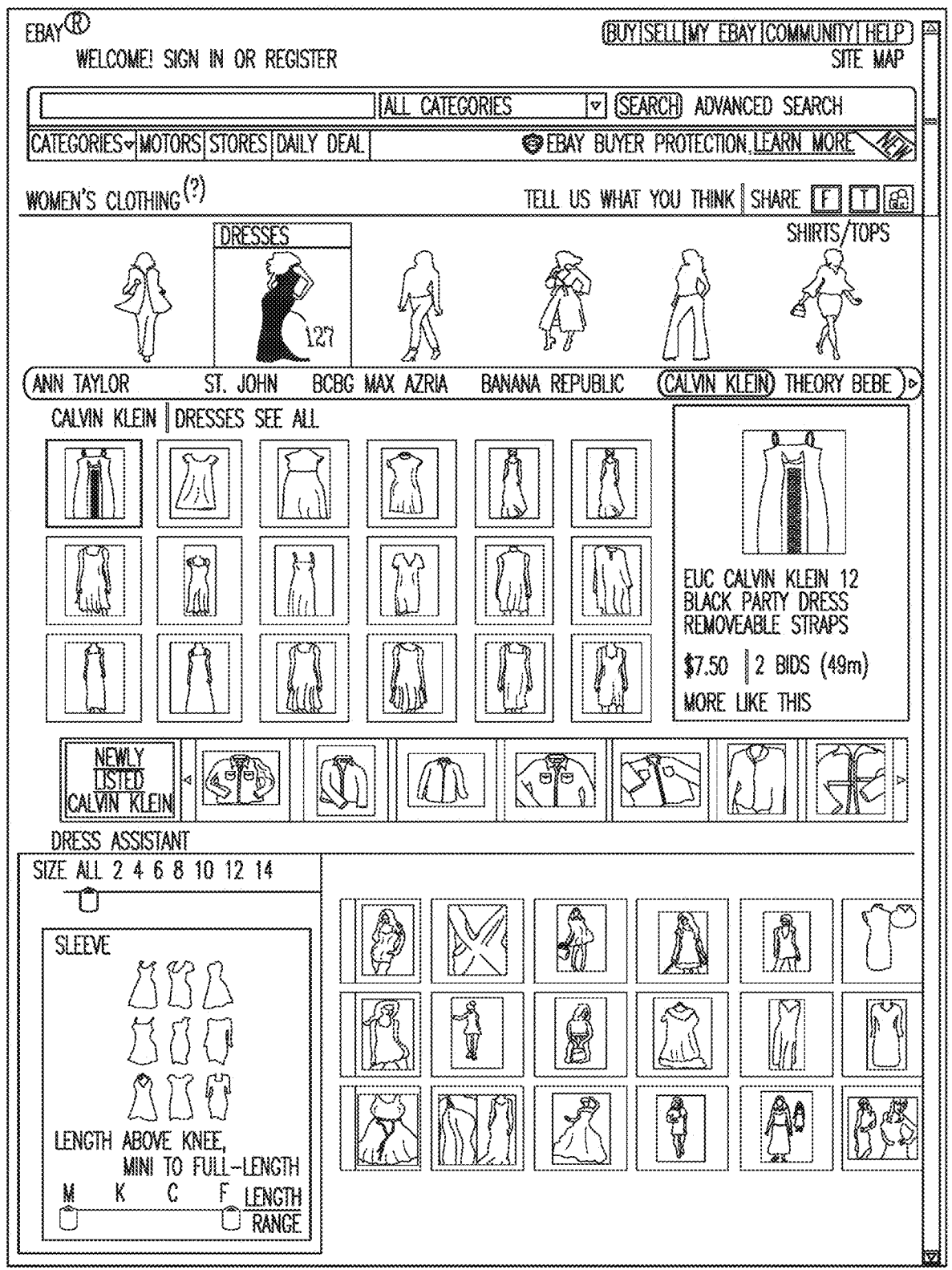
Figure 4D:
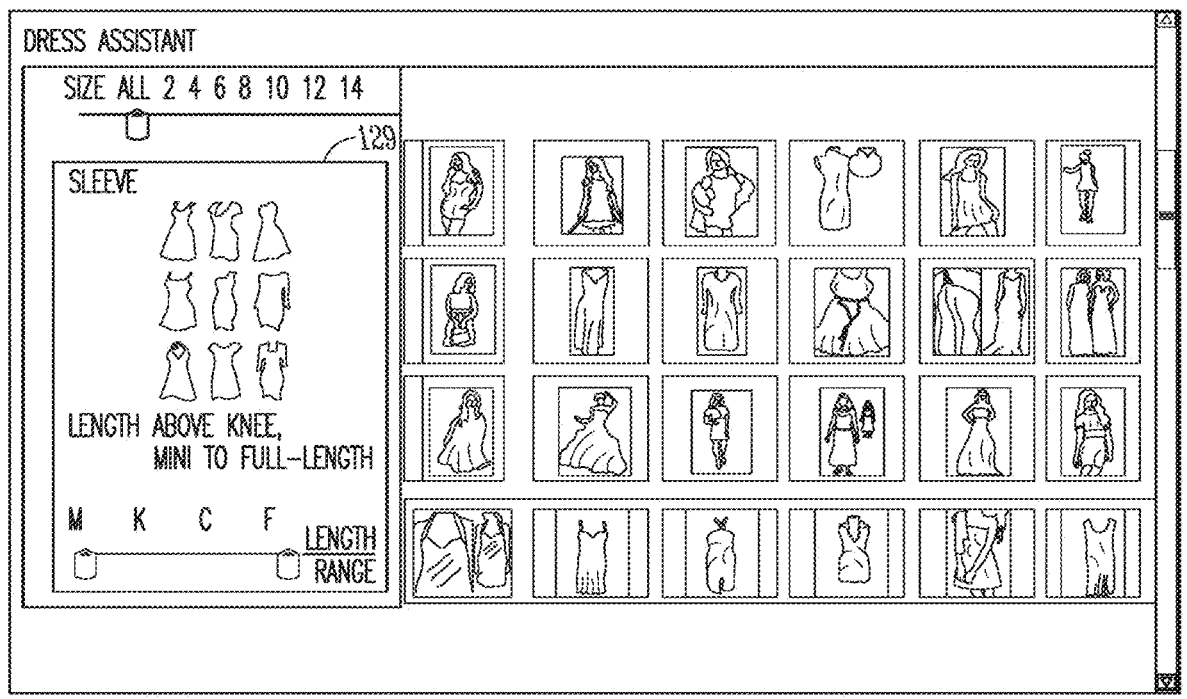
Figure 4E:
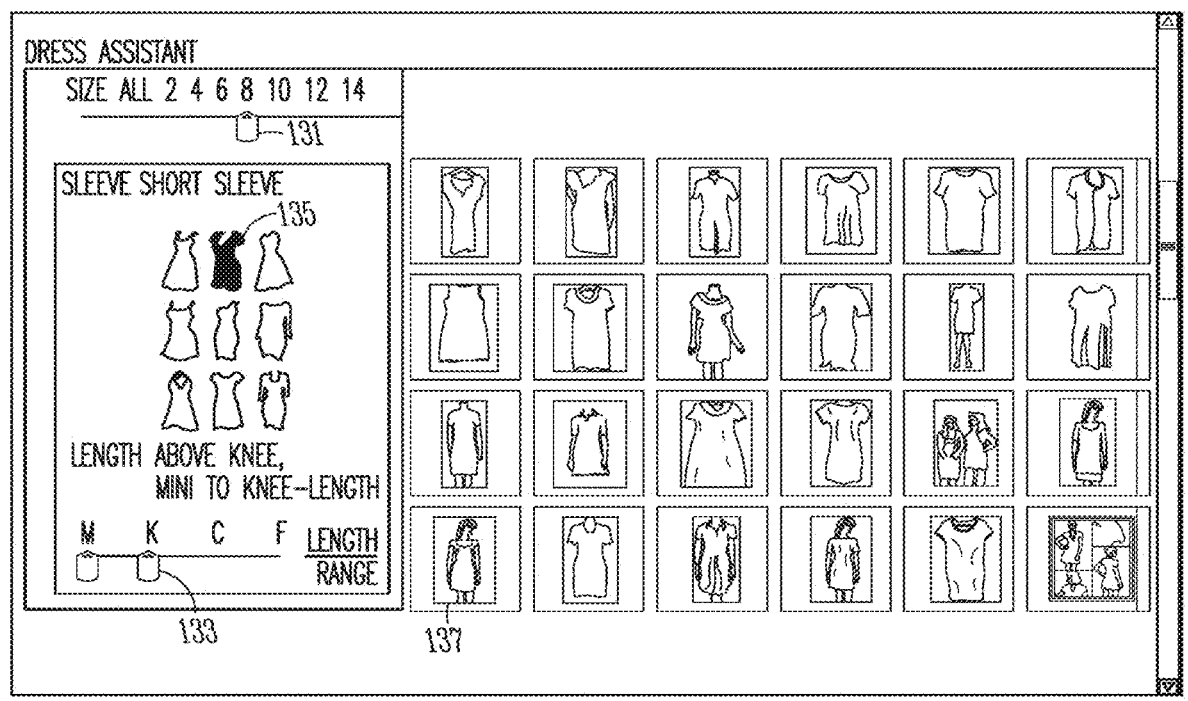
Figure 4F:

This same silhouette process can be used for other types of products, such as handbags, women's clothing, men's clothing and men's shoes, among others. The silhouette process above operates similarly for each. For example, FIG. 4A illustrates the silhouette process for an embodiment involving women's clothes. Brands are seen listed across the top such as Ann Taylor, St. John, BCBT Max Azria, Banana Republic, Calvin Klein, Theory, Bebe, and other brands. The screen can show silhouettes of women's clothing types such as blazers, dresses, jeans, pants, shirts/tops and skirts. One can select, for example, Calvin Klein and select dresses as in FIG. 4B. A type of clothing, for example, dresses 127, can be selected as in FIG. 4C, and all dresses of the type offered by the Calvin Klein brand will be displayed. Silhouettes can also be used for selecting attributes of dresses such as, for example, sleeve type, size, length, and the like. This is seen in FIG. 4D where the types of dresses—sleeveless, short sleeve, strapless, spaghetti strap, one shoulder, long sleeve, halter, cap sleeve, and ¾ sleeve are displayed as at 129. Again, if desired, title of the type of dress can be seen selected by mousing over the appropriate type of dress, and clicking, as one example. This is seen in FIG. 4E. One can also select size, color, length 133 and desired style in silhouette such as short sleeve 135. The resulting images of the dresses offered for sale in that size and color and dress length are then presented to the browser. One could then select one of the desired dresses such as cocktail dress 137 and obtains other sales information ofi merest for the cocktail dress, with the result shown in FIG. 4F. Again, a purchase or bid can be made if desired.

Figure 5A:
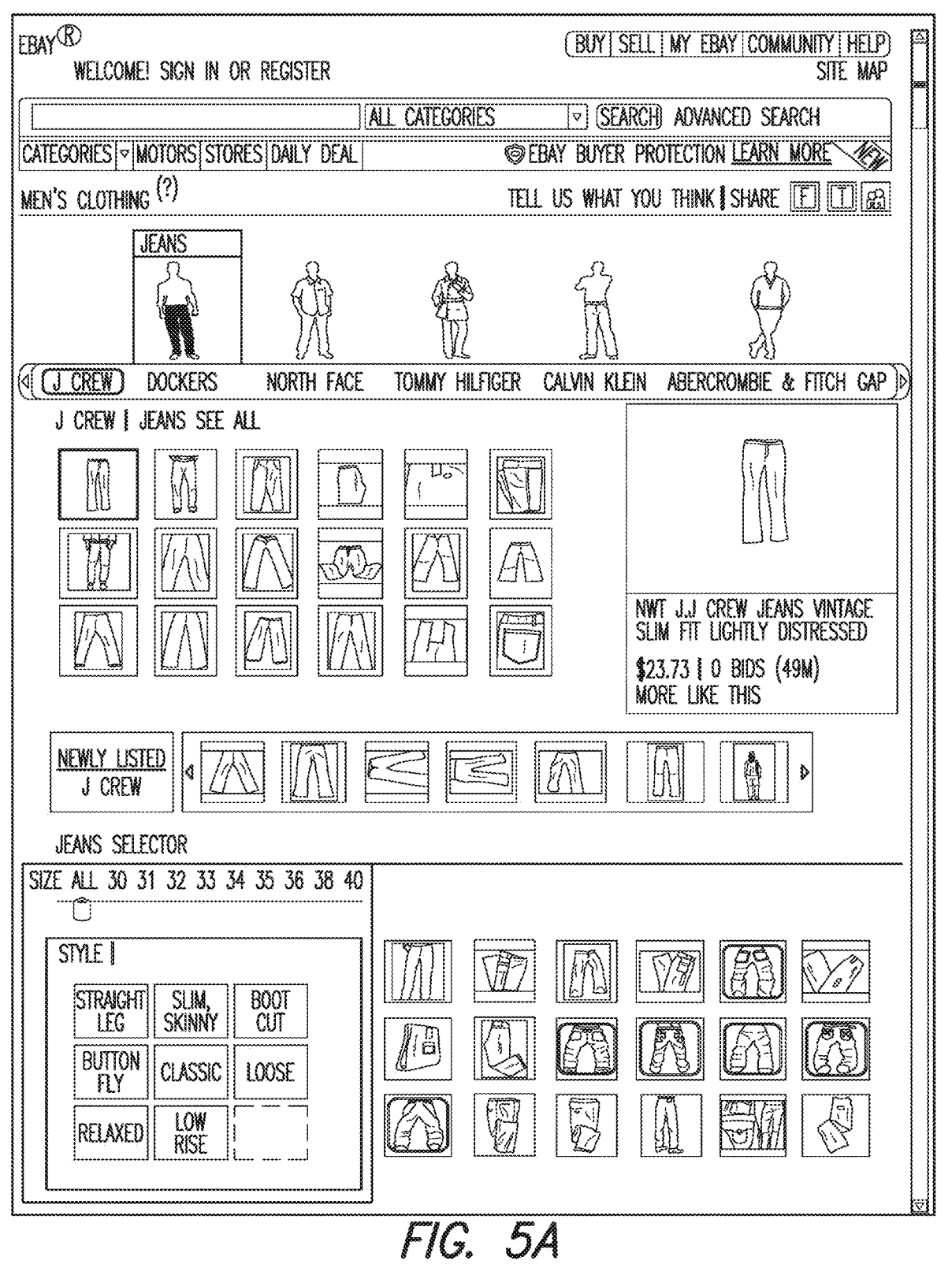
Figure 5B:
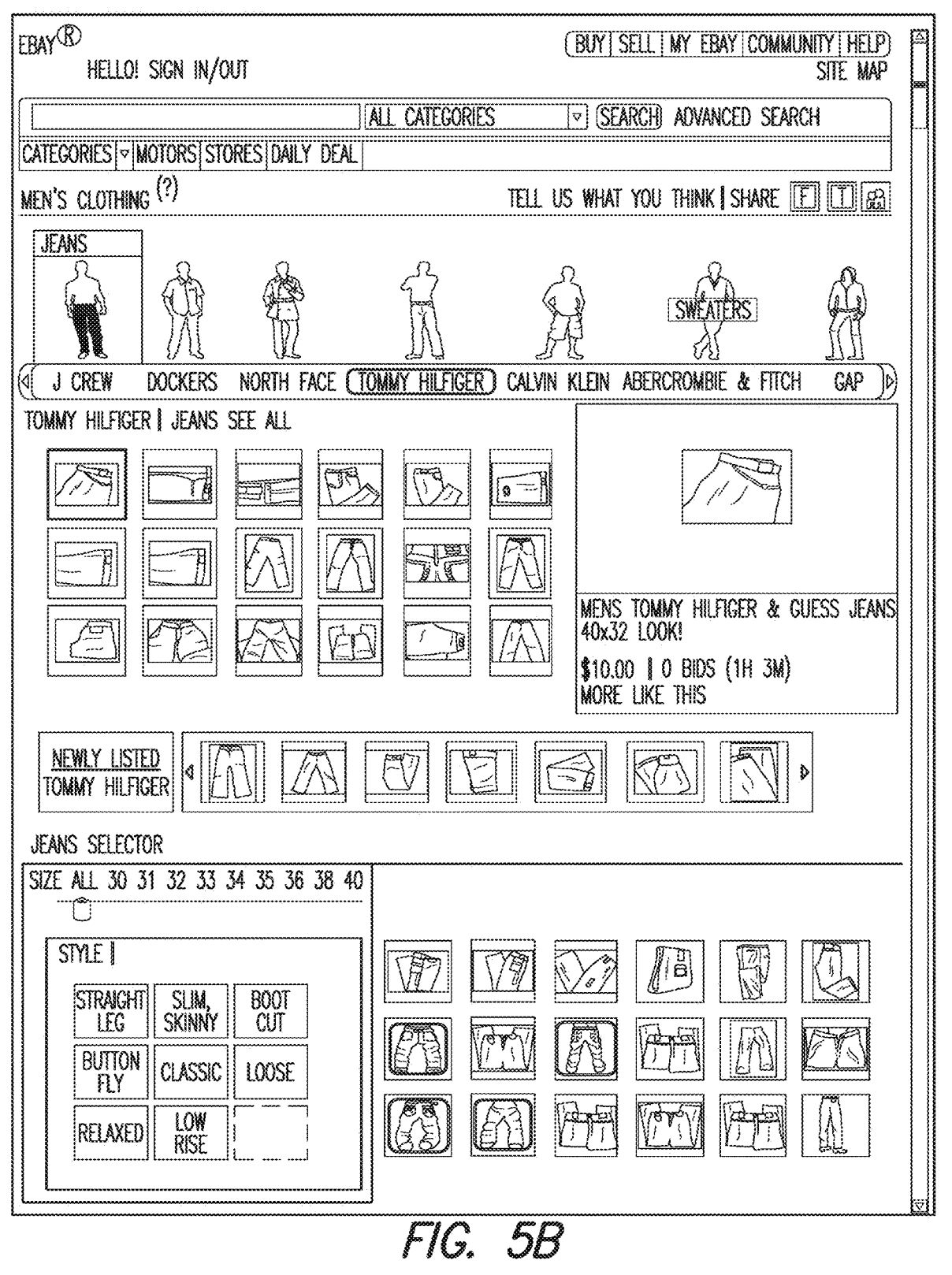
Figure 5C:
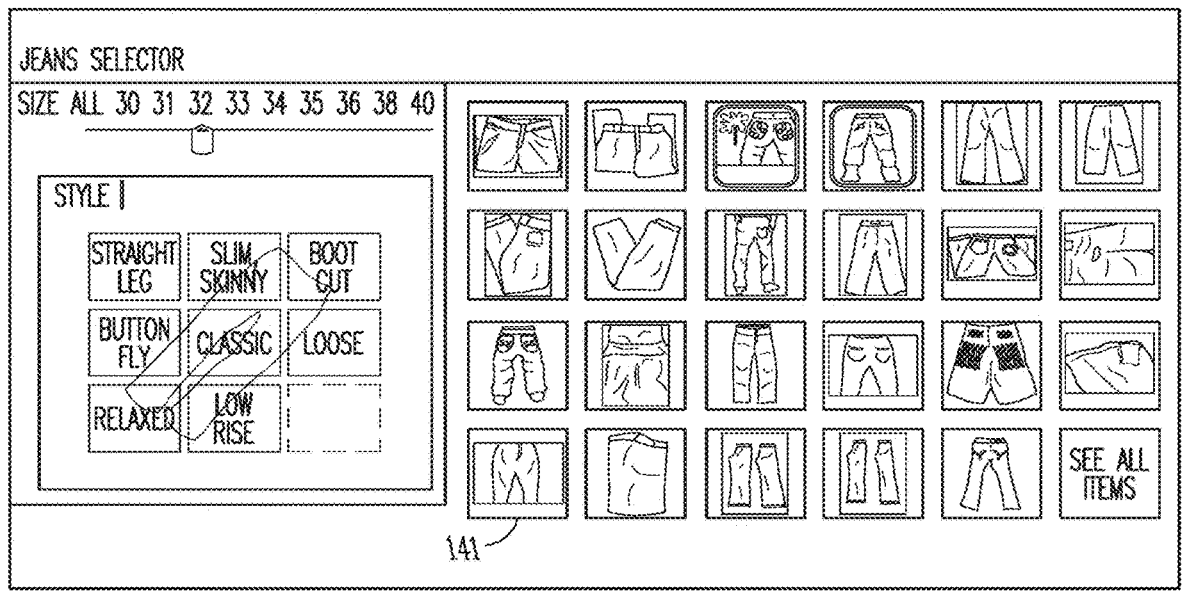
Figure 5D:
Figure 6A:
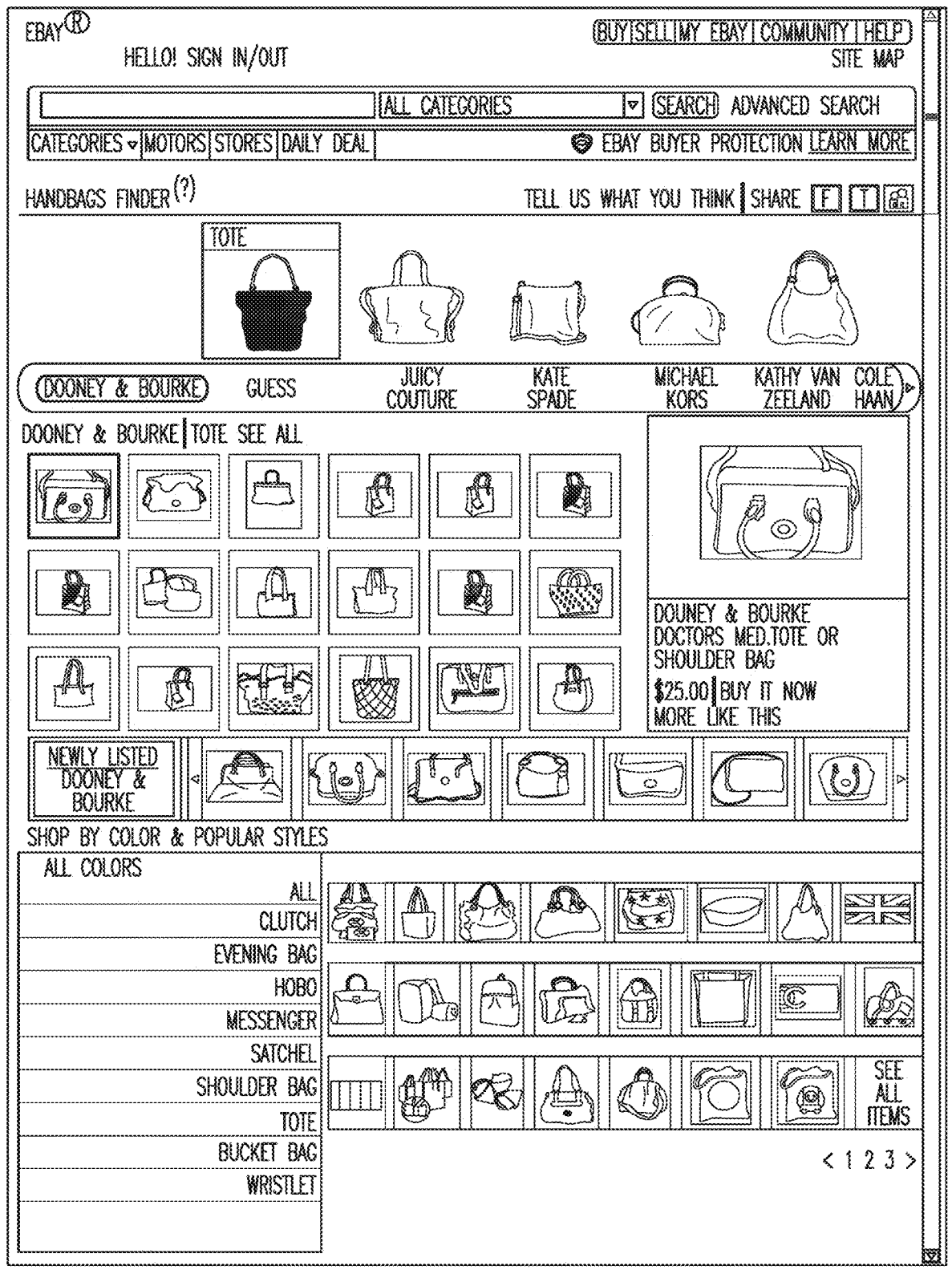
FIGS. 6A-6D illustrate an example of a method of displaying images of item listings, for still another brand of product.
Figure 6B:
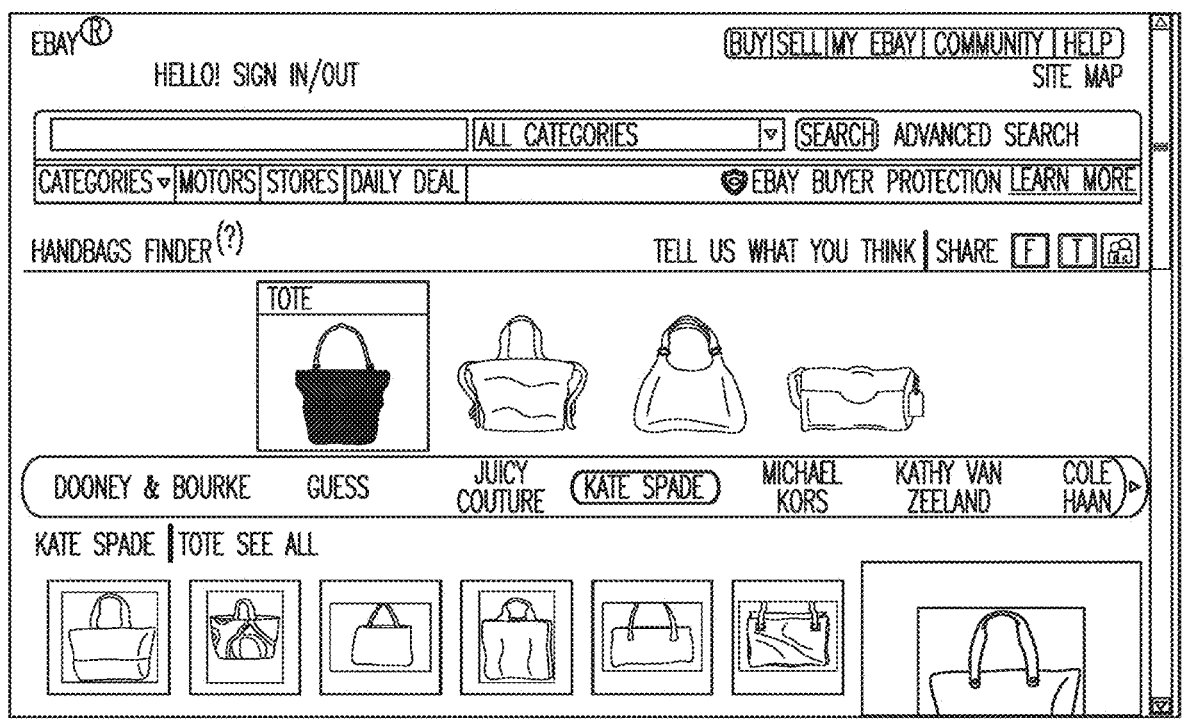
Figure 6C:
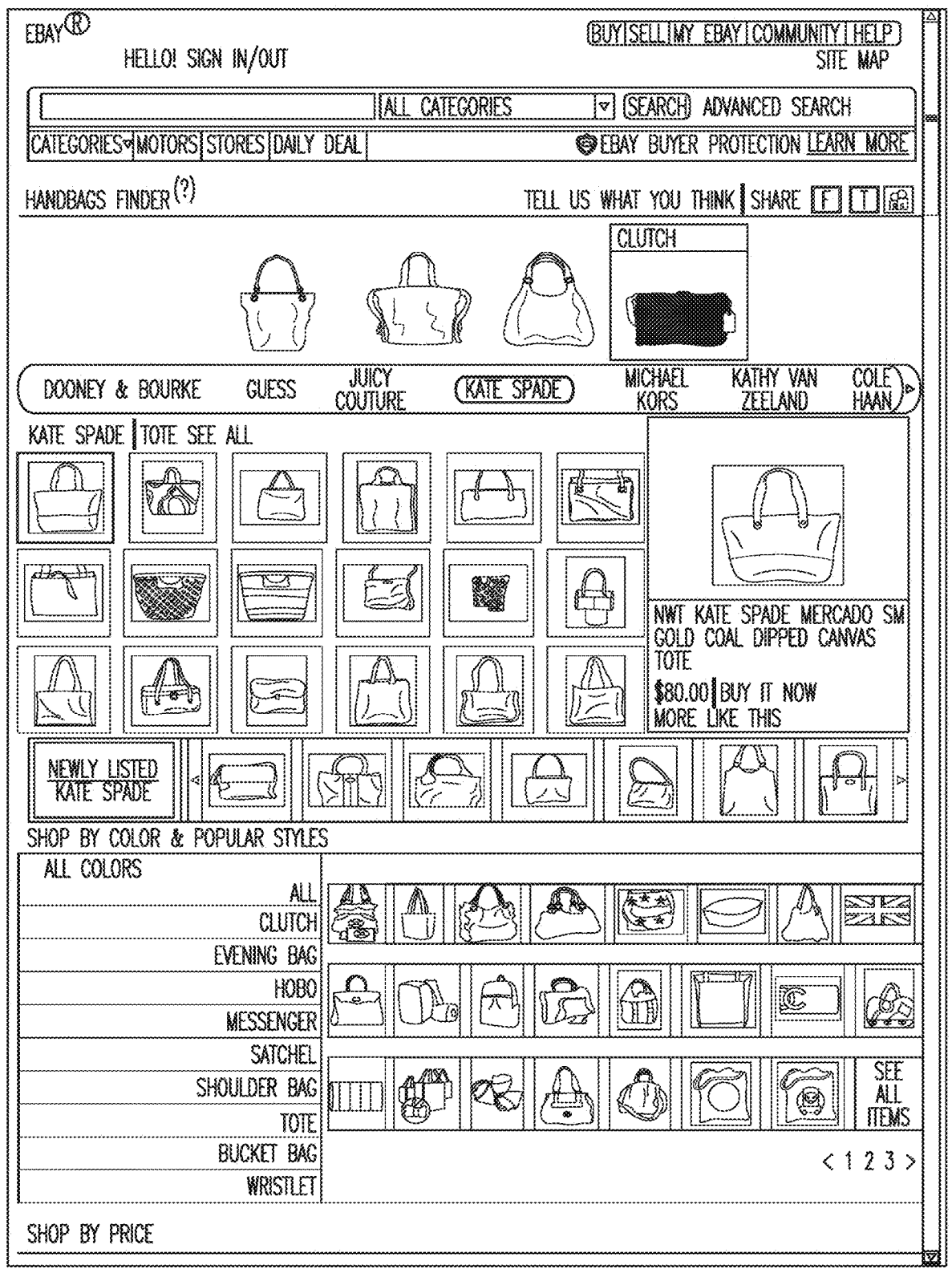
Figure 6D:
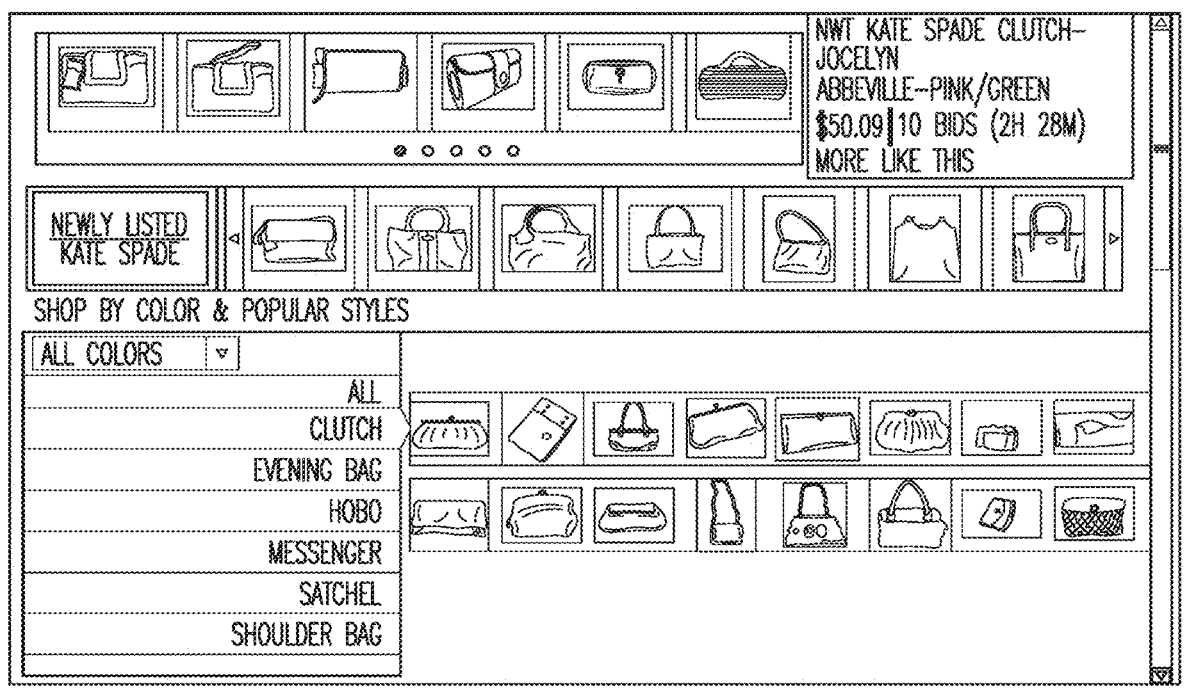

Men's clothing operates similarly, as in FIG. 5A through FIG. 5D, where men's close generally are seen in FIG. 5A. Tommy Hilfiger jeans are selected in FIG. 5B, and attributes such as style and size are returned to the user in response to the user selecting a style and size as in FIG. 5C. A particular selection such as 141 can be selected. As seen in FIG. 5D the particular type of jeans could be purchased. as described in the examples above. The system functions similarly for handbags as seen in FIGS. 6A through 6D where a clutch type of handbag is selected.

Silhouettes can be generated for use in the system in several ways. For example, a silhouette of, say, a man's jacket can be generated using computer applications such as Adobe Illustrator and/or Adobe Photoshop. A jacket outline can be created from the photo of a man wearing a jacket. That is, the outline is traced from a photograph. A second way of obtain silhouettes is by using baseline silhouette vector images bought from i-stockphoto (www.istockphoto.com) and, using the above applications, modifying the image to represent the context of navigation. That is, a black silhouette vector file of a man wearing a jacket stockphoto is purchased and the jacket portion of it drawn out and painted in color to represent the jackets category. Several silhouettes representing several different categories can be created side by side in one large image called a sprite. This sprite is uploaded into the picture server in a desired format, for example as a transparent Portable Networks Graphic (PNG). The transparency aids in applying a background color using, for example, Cascading Style Sheets (CSS) as necessary to imply different states of the same image, for example, hover state, selected state. The developer could then point to each category using pixel co-ordinates as location and assigns a URL to each one to make each silhouette a link to a certain category. Hence one long image replaces the need to upload several images and multiple states of these images which in turn helps save page weight.

Figure 7:
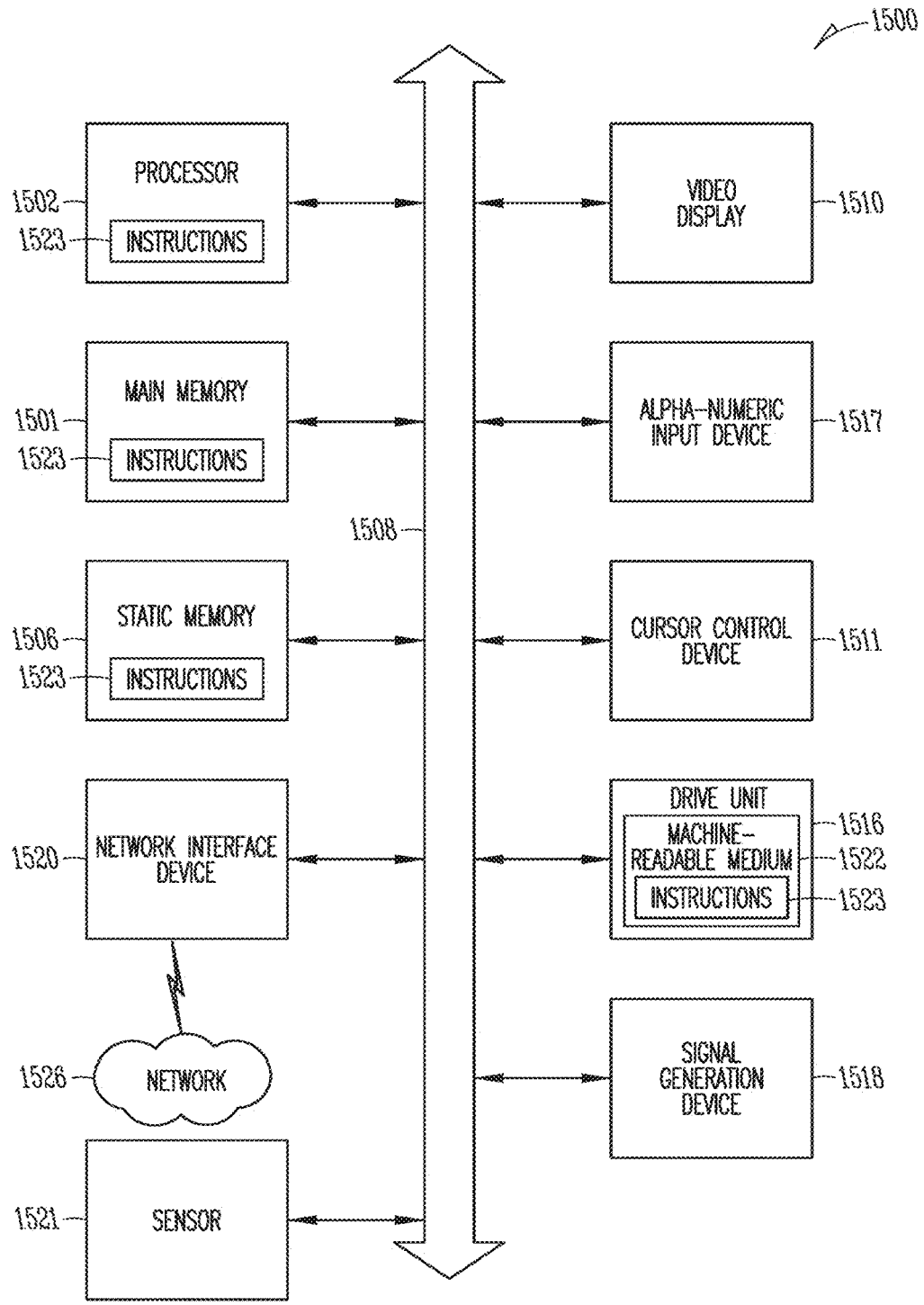
FIG. 7 is a block diagram of a machine in the form of a computing device, mobile or otherwise, within which a set of instructions, for causing the machine to perform any one or more of the methodologies discussed herein, may be executed.

An example of mapping silhouette image information selected by the buyer to textual information to be used as, or as part of, a query for the system to obtain images of the type of item selected by the user can be seen in FIG. 7. For each silhouette, there could a value associated on the web page. For example, "Thigh-high" is associated with the silhouette illustrated. This value ("Thigh-high") could be used retrieve the search parameter value (such as Fashion-Thigh-High) from a static harshmap which contains all the mappings. This could be easily modified to look-up from a Database table or any other datastructure.

Hardware Operation

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example Computer System

FIG. 8 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software) 1523 embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be 1 regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

APPENDIX

A Mouseover or hover box refers to a GUI event that is raised when the user moves or "hovers" the cursor over a particular area of the GUI. The technique is particularly common in web browsers where the URL of a hyperlink can be viewed in the status bar. Site designers can easily define their own mouseover events using Javascript[1] and Cascading Style Sheets.[2] In case of multiple layers the mouseover event is triggered by the uppermost layer.

Mouseover events are not limited to web design and are commonly used in modern GUI programming. Their existence might not even be known to the user as the events can be used to call any function and might affect only the internal workings of the program.

Tooltip

A special usage of mouseover event is a tooltip showing a short description of the GUI object under the cursor. The tooltip generally appears only after the mouse is held over the object for a certain amount of time.

EXAMPLES

```
<!-- Direct usage not recommended | does not conform with web standards -->
<img id="myImage" src="/images/myImage. jpg" onMouseOver="alert('your message');">
// javascript without any framework
var myImg = document.getElementById('myImage');
function myMessaqe( ) {
    alert('your message');
}
if (myImg.addEventListener) { //addEventListener is the standard
```

-continued

```
    method to add events to objects
      myImg.addEventListener('mouseover', myMessage, false);
  }
  else if(myImg.attachEvent) { //for internet Explorer
      myImg.attachEvent('onmouseover', myMessage);
  }
  else [ //for other browsers
      myImg.onmouseover = myMessage;
  ]
  // jQuery example | degrades well if javascript is disabled in client browser
  $("img").mouseover(function( ){
      alert('your message');
  });
```

What is claimed is:

1. A computer implemented method, the method comprising:
    causing, by a processor, display of a user interface at a client device;
    receiving, by the processor and via the user interface, user input to select a product category;
    responsive to the user input to select the product category, causing, by the processor, display of a plurality of selectable brands and a plurality of selectable images for the product category in the user interface, wherein each brand of the plurality of selectable brands represents a respective brand of products within the product category, and wherein each of the plurality of selectable images visually represents one of a plurality of product styles within the product category;
    receiving, by the processor and via the user interface, a first selection of one of the plurality of selectable brands representing a respective brand and a second selection of one of the plurality of selectable images representing a product style; and
    responsive to the first selection and the second selection, causing, by the processor, display of one or more product listings associated with the selected brand and the selected product style in the user interface.

2. The computer implemented method of claim 1, further comprising:
    detecting, by the processor, a mouseover or hover associated with at least one of the plurality of selectable images; and
    causing, by the processor, display of a text description of the at least one of the plurality of product styles in response to detecting the mouseover or the hover.

3. The computer implemented method of claim 1, further comprising:
    detecting, by the processor, selection of a product listing from the one or more product listings; and
    responsive to detecting, by the processor, selection of the product listing from the one or more product listings, enabling, by the processor, purchase of a given product corresponding to the selected product listing.

4. The computer implemented method of claim 1, wherein the plurality of selectable images each comprise a silhouette image of a respective product style within the product category.

5. The computer implemented method of claim 1, wherein each of the plurality of selectable images are mapped to a textual information usable to query a database to locate the one or more product listings.

6. The computer implemented method of claim 1, wherein each of the one or more product listings include one or more images of a respective product associated with the selected brand and the selected product style.

7. The computer implemented method of claim 1, further comprising:
    receiving a third selection of a different one of the plurality of selectable images representing a different product style; and
    responsive to the third selection causing, by the processor, display of one or more different product listings associated with the selected brand and the different selected product style in the user interface.

8. The computer implemented method of claim 1, further comprising:
    receiving a third selection of a different one of the plurality of selectable brands representing a different brand; and
    responsive to the third selection, causing, by the processor, display of one or more different product listings associated with the selected different brand and the selected product style in the user interface.

9. A system comprising:
    at least one hardware processor; and
    a computer-readable storage device storing instructions which, when executed by the at least one hardware processor, cause the system to perform operations comprising:
        causing display of a user interface at a client device;
        receiving, via the user interface, user input to select a product category;
        responsive to the user input to select the product category, causing display of a plurality of selectable brands and a plurality of selectable images for the product category in the user interface, wherein each brand of the plurality of selectable brands represents a respective brand of products within the product category, and wherein each of the plurality of selectable images visually represents one of a plurality of product styles within the product category;
        receiving, via the user interface, a first selection of one of the plurality of selectable brands representing a respective brand and a second selection of one of the plurality of selectable images representing a product style; and
        responsive to the first selection and the second selection, causing display of one or more product listings associated with the selected brand and the selected product style in the user interface.

10. The system of claim 9, the operations further comprising:
    detecting a mouseover or hover associated with at least one of the plurality of selectable images; and
    causing display of a text description of the at least one of the plurality of product styles in response to detecting the mouseover or the hover.

11. The system of claim 9, wherein the plurality of selectable images each comprise a silhouette image of a respective product style within the product category.

12. The system of claim 9, wherein each of the one or more product listings include one or more images of a respective product associated with the selected brand and the selected product style.

13. The system of claim 9, wherein the operations further comprise:
    receiving a third selection of a different one of the plurality of selectable images representing a different product style; and responsive to the third selection causing display of one or more different product listings associated with the selected brand and the different selected product style in the user interface.

14. The system of claim 9, wherein the operations further comprise:
   receiving a third selection of a different one of the plurality of selectable brands representing a different brand; and
   responsive to the third selection, causing display of one or more different product listings associated with the selected different brand and the selected product style in the user interface.

15. A non-transitory computer-readable medium storing instructions which, when executed by at least one hardware processor, cause a system to perform operations comprising:
   causing display of a user interface at a client device;
   receiving, via the user interface, user input to select a product category;
   responsive to the user input to select the product category, causing display of a plurality of selectable brands and a plurality of selectable images for the product category in the user interface, wherein each brand of the plurality of selectable brands represents a respective brand of products within the product category, and wherein each of the plurality of selectable images visually represents one of a plurality of product styles within the product category;
   receiving, via the user interface, a first selection of one of the plurality of selectable brands representing a respective brand and a second selection of one of the plurality of selectable images representing a product style; and
   responsive to the first selection and the second selection, causing display of one or more product listings associated with the selected brand and the selected product style in the user interface.

16. The non-transitory computer-readable medium of claim 15, wherein the plurality of selectable images each comprise a silhouette image of a respective product style within the product category.

17. The non-transitory computer-readable medium of claim 15, wherein each of the plurality of selectable images are mapped to a textual information usable to query a database to locate the one or more product listings.

18. The non-transitory computer-readable medium of claim 15, wherein each of the one or more product listings include one or more images of a respective product associated with the selected brand and the selected product style.

19. The non-transitory computer-readable medium of claim 15, wherein the operations further comprise:
   receiving a third selection of a different one of the plurality of selectable images representing a different product style; and
   responsive to the third selection causing display of one or more different product listings associated with the selected brand and the different selected product style in the user interface.

20. The non-transitory computer-readable medium of claim 15, wherein the operations further comprise:
   receiving a third selection of a different one of the plurality of selectable brands representing a different brand; and
   responsive to the third selection, causing display of one or more different product listings associated with the selected different brand and the selected product style in the user interface.

* * * * *